(12) United States Patent
Roy et al.

(10) Patent No.: US 11,589,284 B2
(45) Date of Patent: Feb. 21, 2023

(54) METHOD AND SYSTEM FOR PRIORITIZING CELL SELECTION

(71) Applicant: Samsung Electronics Co., Ltd., Gyeonggi-do (KR)

(72) Inventors: Koustav Roy, Bangalore (IN); Danish Ehsan Hashmi, Bangalore (IN); Arijit Sen, Bangalore (IN); Jagadeesh Gandikota, Bangalore (IN); Arvind Ramamurthy, Bangalore (IN)

(73) Assignee: Samsung Electronics Co., Ltd.

( * ) Notice: Subject to any disclaimer, the term of this patent is extended or adjusted under 35 U.S.C. 154(b) by 98 days.

(21) Appl. No.: 16/704,658

(22) Filed: Dec. 5, 2019

(65) Prior Publication Data

US 2020/0187081 A1    Jun. 11, 2020

(30) Foreign Application Priority Data

Dec. 5, 2018   (IN) .............................. 201841045949
Dec. 3, 2019   (IN) .............................. 201841045949

(51) Int. Cl.
*H04W 36/30*      (2009.01)
*H04W 36/00*      (2009.01)
(Continued)

(52) U.S. Cl.
CPC .......... *H04W 36/30* (2013.01); *H04B 17/318* (2015.01); *H04W 36/0016* (2013.01);
(Continued)

(58) Field of Classification Search
CPC . H04W 36/30; H04W 36/0061; H04W 36/08; H04W 36/02; H04W 84/045;
(Continued)

(56) References Cited

U.S. PATENT DOCUMENTS

2014/0128058 A1    5/2014  Ji et al.
2015/0105078 A1    4/2015  Ramasamy et al.
(Continued)

FOREIGN PATENT DOCUMENTS

EP    3 198 969    5/2018
EP    3 589 026    1/2020
(Continued)

OTHER PUBLICATIONS

3GPP 5G ETSI TS 124 501 V15.3.0, May 1, 2019, Technical Specification, 5G; Non-Access-Stratum (NAS) protocol for 5G System (5GS); Stage 3 (3GPP TS 24.501 version 15.3.0 Release 15), Copyright ETSI 2019, pp. 486.

(Continued)

*Primary Examiner* — Nam T Huynh
(74) *Attorney, Agent, or Firm* — The Farrell Law Firm, P.C.

(57) ABSTRACT

Disclosed are methods and systems for prioritizing cell selection for availing LADN services. A UE prioritizes cells for selection based on availability of LADN services in the cells. For handover, a base station of a cell, providing LADN services to the UE, prioritizes target cells that provide LADN services that are being currently availed by the UE for ensuring LADN service continuity. The base station initiates addition of secondary cells that provide additional LADN services that are intended by the UE. The UE can predict if a paging message is relevant to a LADN service and send serving requests to the serving cell or other cells to avail the LADN service. The UE detects relay UEs providing LADN services and prioritizes the relay UEs for selection based on availability of LADN services. The UE buffers data if the UE is located at an edge of a LADN service area.

18 Claims, 17 Drawing Sheets

(51) Int. Cl.

| | | |
|---|---|---|
| *H04W 36/08* | (2009.01) | |
| *H04W 36/02* | (2009.01) | |
| *H04W 84/04* | (2009.01) | |
| *H04B 17/318* | (2015.01) | |
| *H04W 48/18* | (2009.01) | |

(52) U.S. Cl.
CPC ... *H04W 36/0061* (2013.01); *H04W 36/0085* (2018.08); *H04W 36/02* (2013.01); *H04W 36/08* (2013.01); *H04W 48/18* (2013.01); *H04W 84/045* (2013.01)

(58) Field of Classification Search
CPC ......... H04W 36/0085; H04W 36/0016; H04W 48/20; H04W 36/26; H04W 24/08; H04W 48/18; H04B 17/318
See application file for complete search history.

(56) References Cited

U.S. PATENT DOCUMENTS

| | | | |
|---|---|---|---|
| 2015/0341832 A1 | 11/2015 | Hwang et al. | |
| 2017/0064691 A1* | 3/2017 | Kubota | H04W 48/16 |
| 2018/0279397 A1* | 9/2018 | Faccin | H04W 8/18 |
| 2018/0324577 A1 | 11/2018 | Faccin et al. | |
| 2019/0021033 A1 | 1/2019 | Liu et al. | |
| 2019/0182788 A1 | 6/2019 | Lee et al. | |
| 2019/0200264 A1* | 6/2019 | Kim | H04W 88/14 |
| 2020/0100147 A1* | 3/2020 | Youn | H04W 36/14 |
| 2020/0382941 A1 | 12/2020 | Lee et al. | |
| 2021/0068016 A1* | 3/2021 | Shi | H04W 36/0085 |

FOREIGN PATENT DOCUMENTS

| | | |
|---|---|---|
| WO | WO 2016/049436 | 3/2016 |
| WO | WO 2018/038490 | 3/2018 |
| WO | WO 2018111029 | 6/2018 |
| WO | WO 2018/174638 | 9/2018 |

OTHER PUBLICATIONS

3GPP 5G ETSI TS 123 501 V15.2.0, Jun. 1, 2018, Technical Specification, 5G; System Architecture for the 5G System (3GPP TS 23.501 version 15.2.0 Release 15), Copyright ETSI 2018pp. 220.

Multi-access Edge Computing, Copyright 2019 ETSI, pp. 5.

ETSI GR MEC 017 V1.1.1, Feb. 1, 2018, Group Report, Mobile Edge Computing (MEC); Deployment of Mobile Edge Computing in an NFV environment, Copyright ETSI 2018, pp. 32.

Kekki, Sami et al., ETSI White Paper No. 28, MEC in 5G networks, Jun. 1, 2018, Copyright ETSI 2018, pp. 28.

Multi-access Edge Computing, Multi-access Edge Computing (MEC) Applications & Security Services—Happiest Minds, https://www.happiestminds.com/insights/multi-access-edge-computing/, Copyright Happiest Minds 2019, pp. 5.

Ericsson, "Service Area Restrictions Applicable for PLMNs in Registration Area", C1-188520, 3GPP TSG-CT WG1 Meeting #113, Nov. 26-30, 2018, 19 pages.

International Search Report dated Mar. 12, 2020 issued in counterpart application No. PCT/KR2019/017058, 8 pages.

European Search Report dated Sep. 29, 2021 issued in counterpart application No. 19892847.5-1218, 7 pages.

Indian Examination Report dated Oct. 8, 2021 issued in counterpart application No. 201841045949, 7 pages.

* cited by examiner

METHOD AND SYSTEM FOR PRIORITIZING CELL SELECTION

PRIORITY

This application claims priority under 35 U.S.C. § 119(a) to Indian Provisional Patent Application Serial No. 201841045949 (PS), which was filed in the Indian Intellectual Property Office on Dec. 5, 2018, and to Indian Complete Patent Application Serial No. 201841045949 (CS), filed in the Indian Intellectual Property Office on Dec. 3, 2019, the entire content of each of which is incorporated herein by reference.

BACKGROUND

1. FIELD

The present disclosure relates generally to local area data network (LADN), and more particularly, to methods and systems for prioritizing cell selection for availing LADN services.

2. DESCRIPTION OF RELATED ART

In $5^{th}$ Generation (5G) systems, mobile edge computing (MEC) can be used for providing services such as low latency services, mission critical services, internet of things (IoT) services, and so on. $3^{rd}$ Generation Partnership Project (3GGP) provides functional enablers such as a LADN to support MEC. A 5G Core Network can provide support to utilize LADN services in a certain area in which MEC applications are deployed. Access to the LADN services can be availed in a specific LADN service area, defined as a set of tracking areas (TAs) in a serving public land mobile network (PLMN). A LADN indication information element can be used for requesting for LADN information. The LADN indication information element can contain a minimum of 0 and a maximum of 8 different LADN data network name (DNN) values. If the LADN indication information element conveys more than 8 LADN DNN values, the first 8 LADN DNN values can be considered and remaining octets (groups of 8 LADN values) of the information element can be ignored.

A user equipment (UE), intending to avail a LADN service, operating in IDLE mode, can perform cell selection using existing criteria such as reference signal received power (RSRP) and reference signal received quality (RSRQ). Performing cell selection using the existing methods may lead to the UE selecting a cell which does not provide the LADN service while ignoring a neighboring cell that can provide the LADN service with an acceptable cell selection criterion. The UE may not be able to avail the LADN service provided by the neighboring cell if the neighboring cell belongs to either the same or different PLMNs (as that of the selected cell).

In a scenario of handover (considering the UE is at a cell edge and has found another (target) cell that is providing better coverage compared to serving cell at that location), if a serving cell providing a specific LADN service selects a target cell that does not support the specific LADN service, the UE is likely to experience discontinuity in the LADN service. In case, the UE intends to avail a plurality of LADN services and a cell in which the UE is currently camped does not provide support to all the LADN services intended for usage by the UE, the UE may not able to avail all of the plurality of LADN services.

Currently, if the UE intends to avail a LADN service, the UE can send a service request to a cell in which the UE is currently camped. If the cell is not part of a LADN service area (if the LADN service is not supported by the cell), the service request is likely to be rejected and the UE may not be able to avail the LADN service.

Currently, if the UE located at an edge of a LADN service area and availing a LADN service using a LADN protocol data unit (PDU) moves out of the LADN service area, the UE needs to establish a normal PDU. If the UE moves into the LADN service area again, the UE needs to re-activate the LADN PDU. Frequent activation and de-activation of the LADN PDU may lead to an increase in signaling overhead and consequently data stall.

If the UE receives LADN information relevant only to a current PLMN (to which the UE is connected) and reception of LADN services are interrupted, the UE may not be able to determine or select another PLMN, such as Equivalent PLMN (EPLMN), that can support the required LADN services in the current location.

The UE may not be able to determine whether a relay UE can provide LADN services, type of supported LADN services. This can prevent the UE (acting as a remote UE) to access the LADN services. If the UE is able to select a relay UE amongst a plurality of relay UEs, based on existing criterion, the UE will select a relay UE with a higher RSRP level even if the relay UE does not provide LADN services. On the other hand, the UE may not select a relay UE that provides support for the required LADN services if RSRP of the relay UE is low (but within an acceptable RSRP level).

Currently, if the UE receives more than 8 LADN DNN values in a Registration Accept message from a network, the UE shall store the first 8 LADN DNN values and ignore other values. In such cases, the UE may not able to access other LADNs. In certain cases, the UE may intend to receive LADN services from the LADN DNNs that had been previously ignored. The UE may not be able to request for a specific LADN service from the LADN DNNs.

FIG. 1 is an example cell selection or reselection scenario, wherein the UE is not able to receive intended LADN services. Consider that the UE is subscribed to LADN 1 and LADN 2 services and is located within the coverage area of cell 1 and cell 2. Consider that cell 1 is not within any LADN service area and does not provide support for LADN services, and cell 2 is providing LADN 1 and LADN 2 services to the UE. The UE can register with an access and mobility function (AMF) of the 5G core network and obtain a list of LADN service areas (TA list). The UE operating in the idle mode can measure the RSRP/RSRQ of signals received from cell 1 and cell 2. Based on the measurements, the UE can determine that the RSRP of the signals received from the base stations in cell1 and cell2 are of acceptable levels, with the signals received from cell 1 having higher signal strength (RSRP) compared to that of the signals received from cell 2. Based on the existing criteria of cell selection, the UE is likely to camp on to cell1, as cell 1 is ranked higher for cell selection, even though cell 1 is not part of the LADN service area. Thus, the UE is unable to receive LADN 1 and LADN 2 services.

FIG. 2 is an example handover scenario, wherein the UE experiences discontinuity in reception of LADN services. Consider that the UE is camped to a serving cell and is receiving a LADN 1 service. As depicted in FIG. 2, there is an overlap between coverage areas of the serving cell, cell 1 and cell 2. The serving cell and cell 2 are capable of providing access to LADN 1 service to the UE, whereas cell 1 may not support LADN services. When the UE starts moving towards edge of the serving cell, the UE can perform RSRP/RSRQ measurement of signals received from of cell 1 and cell 2. The UE can send measurement reports for both cell 1 and cell 2 to the serving cell. If a base station in the serving cell determines that signals received from cell 1 are having higher signal strength compared to that of the signals received from cell 2, the base station in the serving cell may trigger a handover procedure for the UE from the serving cell to cell 1 (based on existing criteria of handover). On completion of the handover procedure, the UE will be camped to cell 1. As a result LADN 1 service will be discontinued.

FIG. 3 is an example scenario, wherein the UE is not able to access an intended LADN service if the LADN service is not supported by the primary cell. Consider that the UE is camped to a primary cell and is receiving a LADN 1 service. As depicted in FIG. 3, there is an overlap between coverage areas of the primary cell, cell 1 and cell 2. The primary cell and cell 2 provide the LADN 1 service to the UE. The cell 1 provides a LADN 2 service to the UE. The UE is currently receiving the LADN 1 service from the primary cell. At a particular instant, the UE may intend to avail a LADN 2 service along with the LADN 1 service. As the UE is camped on the primary cell, which does not support the LADN 2 service, the UE may not be able to avail the LADN 2 service. If the UE disconnects from the primary cell and registers with cell 1, the UE can avail the LADN 2 service. However, if the UE disconnects from the primary cell the UE will not be able to receive the LADN 1 service.

FIG. 4 is a flowchart 400 depicting an existing scenario, wherein the UE camped in a serving cell is not able to receive a LADN service if the serving cell does not support the LADN service. Consider that the UE is in the idle mode (401). The UE receives a paging message, which is specific to the LADN service (402). Thereafter, the UE can send a service request to a base station in the serving cell to initiate receiving the LADN service (403). As the UE is not camped on a cell providing that LADN service (serving cell does not provide the LADN service), the AMF may send a message to the UE indicating a cause, viz., 'LADN not available' (404). Thus, the UE is not able to receive the LADN service. In certain cases, the UE may not be able to send a PDU session establishment request or the base station in the serving cell may reject the PDU session establishment request.

SUMMARY

An aspect of the present disclosure provides methods and systems for prioritizing selection/reselection of cells based on availability of LADN services in the cells.

Another aspect of the present disclosure is to enable the UE to prioritize cells for cell selection based on at least one of: availability of LADN services in the cells and previous selection of the cells based on utilization of LADN services by the UE.

Another aspect of the present disclosure is to enable a base station of a cell, providing LADN services to the UE, to prioritize target cells that provide LADN services that are being currently availed by the UE, during handover, in order to ensure LADN service continuity.

Another aspect of the present disclosure is to enable the base station to initiate addition of secondary cells and/or cell aggregation to avail additional LADN services that are not by a serving cell in which the UE is camped.

Another aspect of the present disclosure is to enable the UE to predict if a received paging message is relevant to a LADN service and, thereafter, send a service request to the serving cell (if the LADN service is available in the serving cell), or identify a cell providing the LADN service and send a service request to the identified cell.

Another aspect of the present disclosure is to enable detecting relay UEs that provide support for LADN services and allow the UE to prioritize the relay UEs for selection based on availability of specific LADN services intended by the remote UE and capability to provide support the specific intended LADN services.

Another aspect of the present disclosure is to minimize signaling overhead by preventing frequent activation and deactivation of LADN PDU, wherein data is buffered using the LADN PDU if the UE is at an edge of a LADN service area and predicts future data requirement, wherein an Internet PDU is activated and the LADN PDU is deactivated if the UE is outside the LADN service area and the buffered data reduces below a predefined threshold.

Accordingly, the embodiments provide methods and systems for prioritizing selection/reselection of cells based on availability of LAD) services in the cells.

In accordance with an aspect of the present disclosure, a method is provided. The method includes receiving, by a user equipment (UE) (501), local area data network (LADN) information from a current cell, comprising at least one LADN service identity (ID) for a LADN service and at least one neighboring cell providing the LADN service; detecting, by the UE (501), presence of the at least one neighboring cell providing the LADN service based on the LADN information; identifying, by the UE (501), at least one of strength and quality of signals received from the at least one neighboring cell and a currently connected cell; and connecting, by the UE (501), to the at least one neighboring cell when the determined at least one of strength and quality of the signals is above a threshold.

In accordance with an aspect of the present disclosure, a system is provided. The system includes a user equipment (UE) (501); a base station (502); an access and mobility function (AMF) (503); a server (504); and a relay UE (505); wherein the UE (501) is configured to: receive local area data network (LADN) information from a current cell, comprising at least one LADN service identity (ID) for a LADN service and at least one neighboring cell providing the LADN service; detect presence of the at least one neighboring cell providing the LADN service based on the LADN information; identify at least one of strength and quality of signals received from the at least one neighboring cell and a currently connected cell; and connect to the at least one neighboring cell when the determined at least one of strength and quality of the signals is above a threshold.

In accordance with an aspect of the present disclosure, a method is provided. The method includes detecting that the UE (500) is about to move out of the first LADN Area; detecting availability of a plurality of network access points, comprising of a LADN enabled cell, a non-LADN cell, a Device-to-Device (D2D) cell, and a Wireless-Fidelity (Wi-Fi) cell as the UE (500) is about to move out of the first LADN Area; determining availability of at least one of a plurality of LADN services in the plurality of network access points; and connecting to the at least one network access point providing at least one of the first LADN services and the at least one of a plurality of LADN services.

In accordance with an aspect of the present disclosure, a system is provided. The system includes detecting that the UE (500) is about to move out of the first LADN Area; detecting availability of a plurality of network access points, comprising of a LADN enabled cell, a non-LADN cell, a Device-to-Device (D2D) cell, and a Wireless-Fidelity (Wi-Fi) cell as the UE (500) is about to move out of the first LADN Area; determining availability of at least one of a plurality of LADN services in the plurality of network access points; and connecting to the at least one network access point providing at least one of the first LADN services and the at least one of a plurality of LADN services.

BRIEF DESCRIPTION OF THE DRAWINGS

The above and other aspects, features, and advantages of certain embodiments of the present disclosure will be more apparent from the following description taken in conjunction with accompanying drawings, in which.

DETAILED DESCRIPTION

Figure 1:
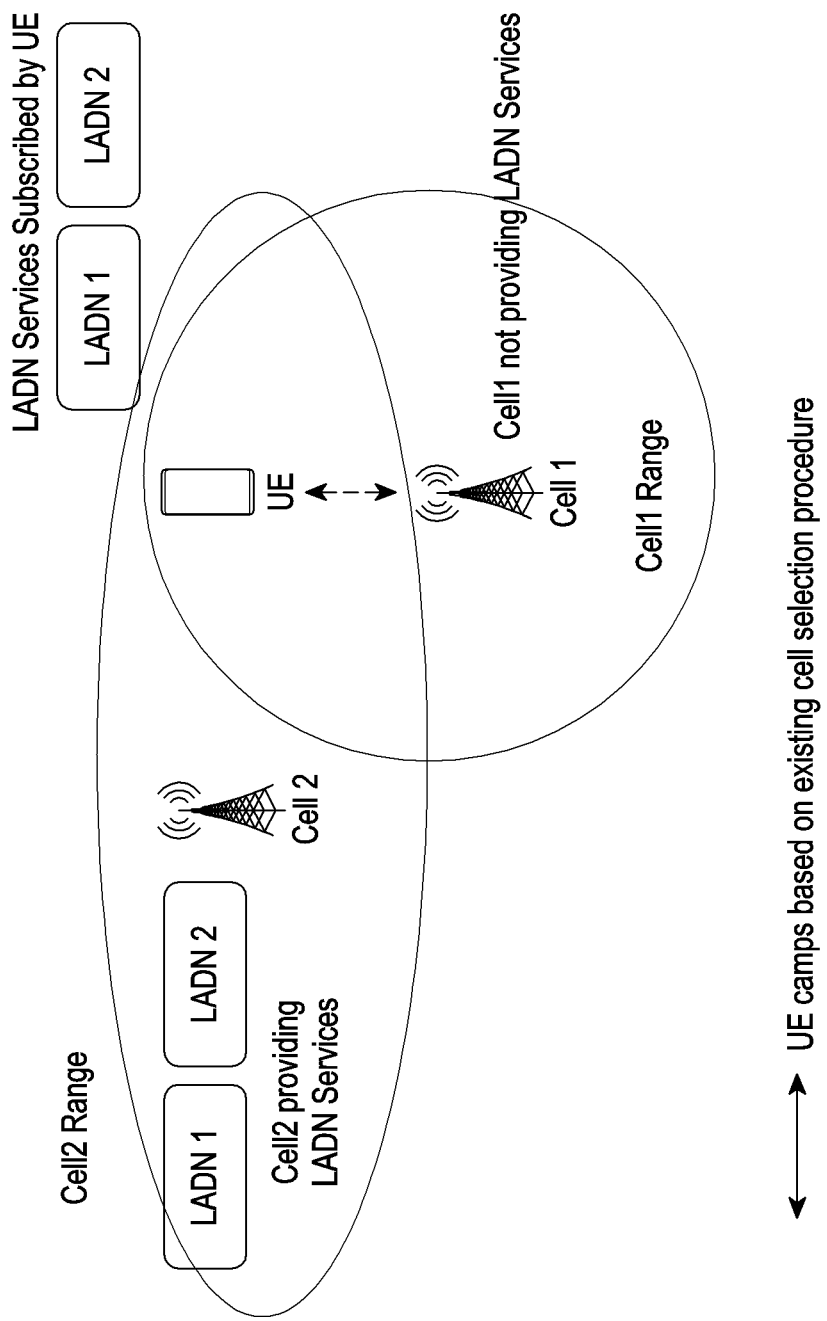
FIG. 1 is an example cell selection or reselection scenario, wherein the UE is not able to receive intended LADN services.
Figure 2:
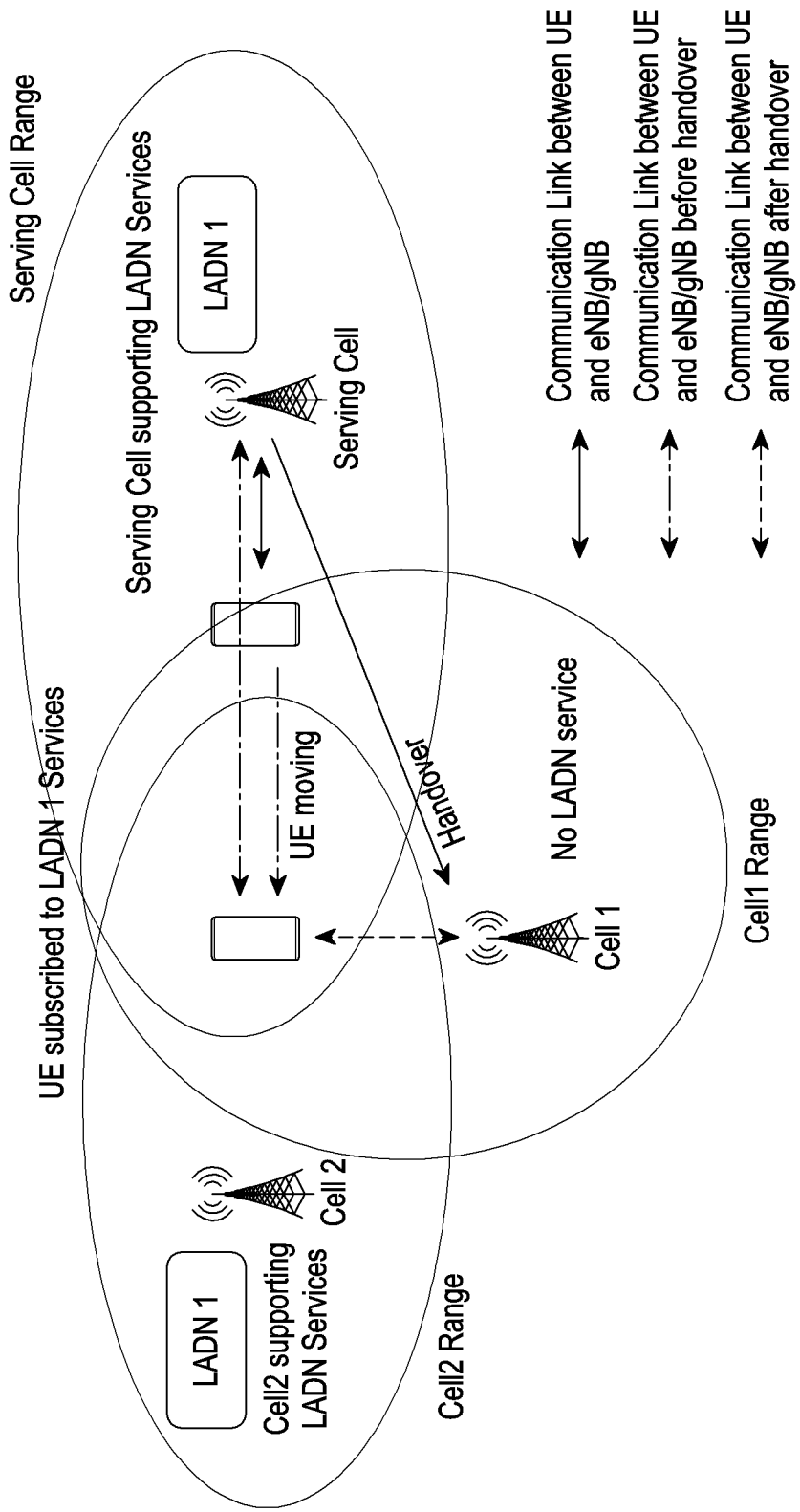
FIG. 2 is an example handover scenario, wherein the UE experiences discontinuity in reception of LADN services.
Figure 3:
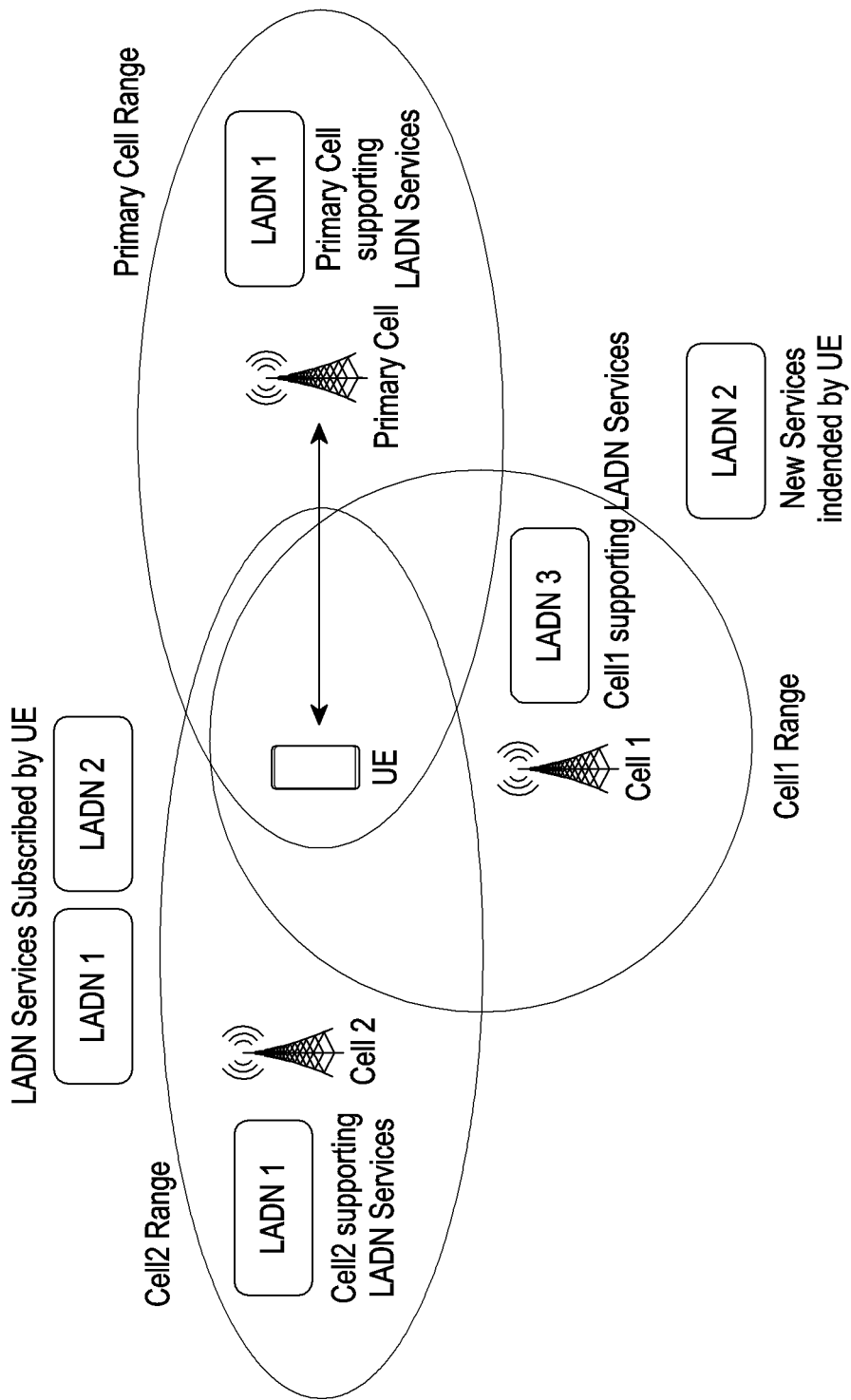
FIG. 3 is an example scenario, wherein the UE is not able to access an intended LADN service if the LADN service is not supported by the primary cell.
Figure 4:
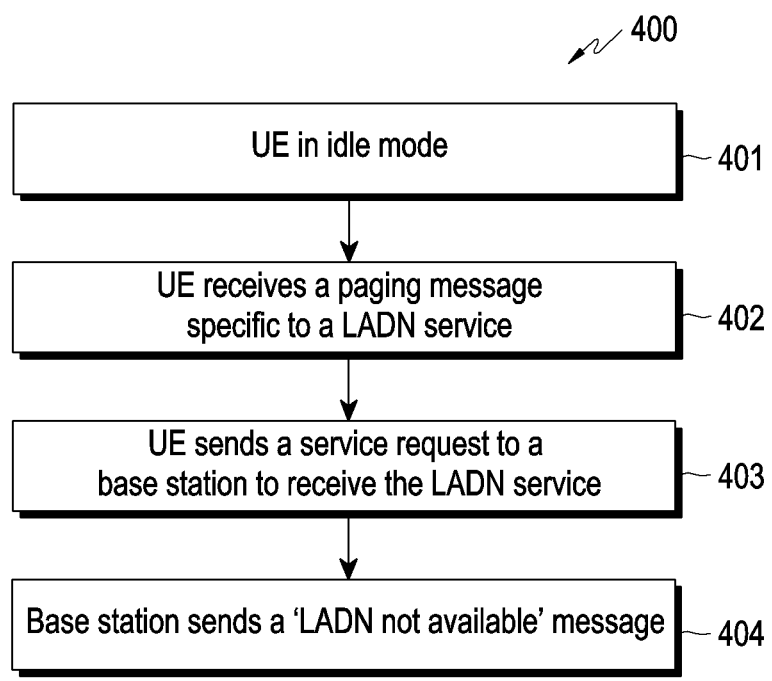
FIG. 4 is a flowchart depicting an existing scenario, wherein the UE camped in a serving cell is not able to receive a LADN service if the serving cell does not support the LADN service.

Embodiments of the present disclosure are described with reference to the accompanying drawings. Descriptions of well-known components and processing techniques are omitted so as to not unnecessarily obscure the present disclosure. The examples used herein are intended merely to facilitate an understanding of ways in which the present disclosure may be practiced and to further enable those of skill in the art to practice the present disclosure. Accordingly, the examples are not intended to be construed as limiting the scope of the present disclosure.

The present disclosure discloses methods and systems for prioritizing selection/reselection of cells based on availability of LADN services in the cells, LADN services currently or previously availed (subscribed) from the cells, factors such as signal strength and quality received from the cells, and so on. The embodiments include obtaining LADN information such as type of LADN services that are available and supported by a serving cell and a plurality of neighboring cells. The embodiments include storing the LADN information (such as physical cell identity (ID), frequency, PLMN ID, available LADN services, LADN service subscription information, tracking area indicator (TAI) list, cell location, LADN service usage information, LADN service area, and so on). The embodiments include storing a record of selections of cells based on LADN services in a database.

The embodiments include performing measurement of signals, received from cells providing LADN services, and reporting the measurements to a base station of a serving cell. The embodiments include prioritizing the cells providing LADN services for camping (selection) over other cells and choosing one of the cells as a target cell during handover. The target cell can provide LADN services that are currently being provided by the serving cell. Thus, continuity of LADN services is ensured after handover.

The embodiments include adding a secondary cell and/or performing cell aggregation to avail additional LADN services from the secondary cell that are not provided by the serving cell. The embodiments include simultaneously receiving different LADN services from the serving cell and the secondary or aggregated cell.

The embodiments include periodically checking for cells that provide LADN services of specific categories that can be availed. The embodiments include camping on such cells on priority, if the serving cell does not provide the LADN services of the specific categories.

The embodiments include determining cells that provide LADN services, if paging messages are received. The embodiments include determining or predicting whether the received paging messages are relevant to intended LADN services. The prediction can be performed based on history of reception of the LADN services and reception of LADN services from specific cells, wherein the history can be retrieved from a database or a lookup table. The embodiments include sending a service request to a cell that provides the intended LADN services.

The embodiments, acting as a remote UE, include receiving information from at least one relay UE about capability of the at least one relay UE to provide LADN services. The embodiments include prioritizing selection of a relay UE based on the LADN service capability.

The embodiments include buffering data based on location and prediction of future data requirement. If the location is edge of a LADN service area data is downloaded and buffered. The embodiments include providing LADN services using the buffered data and refraining from establishing an Internet PDU if the location is out of the LADN service area. The embodiments include predicting whether the future location will be within the LADN service area. If it is predicted that the future location is likely to be outside the LADN service area and the downloaded buffer is below a threshold data, the Internet PDU can be activated. The embodiments include downloading minimum possible data using the Internet PDU (without hampering user experience), while outside the LADN service area.

Referring now to the drawings, and more particularly to FIGS. 5 through 13, where similar reference characters denote corresponding features consistently throughout the figures, there are shown preferred embodiments.

Figure 5:
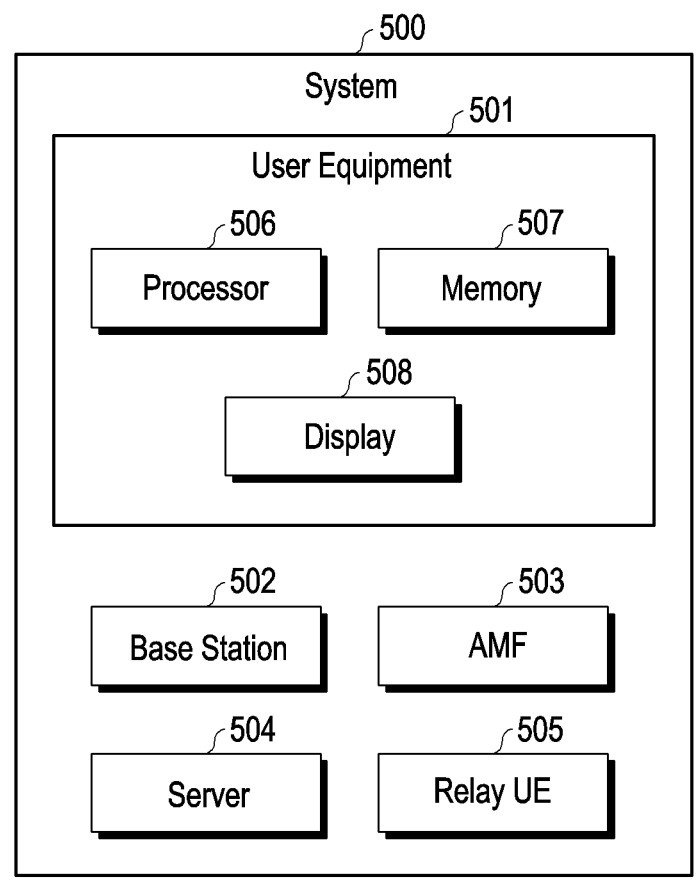
FIG. 5 is various units of a system for prioritizing cell selection/reselection based on availability of LADN services, according to embodiments.

FIG. 5 is various units of a system 500 for prioritizing cell selection/reselection based on availability of LADN services, according to embodiments. As depicted in FIG. 5, the system 500 comprises of a UE 501, a base station 502, an access and mobility function (AMF) 503, a server 504, and a remote UE 505. The UE 501 comprises of a processor 506, a memory 507, and a display 508. The processor can include an application processor and a communication processor. The memory 507 can include a database. The base station 502 can be an evolved Node B (eNB), or a next generation Node B (gNB).

It can be considered that the UE 501 is currently camped in a cell that includes the base station 502, and that the UE avails LADN services from the base station 502. The cell in which the UE 501 is currently camped can be referred to herein as the primary cell and/or the serving cell. The AMF 503 is part of a Fifth Generation (5G) core network. The server 504 can be part of a cloud. If the UE 501 acts as a remote UE, the UE 501 can receive LADN service through the relay UE 505. The system 500 can include a plurality of UEs, base stations (in the serving cell or other neighboring cells) and remote UEs. For the sake of illustration, a single UE, a single base station, and a single relay UE have been depicted.

The UE 501 can obtain LADN information from the AMF 503 and store the LADN information in the database. The LADN information comprises of a list of LADN services associated with a PLMN ID. Each LADN service can be associated with a LADN ID. The LADN information includes tracking area code(s) (TACs) in which each of the LADN services are available. An area in which a particular LADN service is available can be referred to as LADN service area. An LADN service area can be part of a single or multiple tracking areas (TAs). The UE 501, base station and other UEs (that are connected to the 5G core network) can store the LADN information in the server 504.

The processor 506 can consolidate LADN information stored in the server 504 and the database. The processor 506 can create a lookup table in which the consolidated LADN information can be stored. The UE 501 can refer to the lookup table for cell selection for camping and signal measurement. The processor 506 can update the lookup table when the UE 501 registers with a particular base station. The processor 506 can initially configure the lookup table with LADN information received from the AMF 503. The processor 506 updates the lookup table, each time the UE 501 registers with a particular network.. Consider that the UE 501 was previously registered to a network and is currently registered with a network with which the network 502 belongs. The processor 506 can update the lookup table when the UE 501 registers with the network. The update may be necessary because LADN services subscribed by the UE 501 at a certain time period may vary. The UE 501 may stop using LADN services availed previously or request new LADN services. Similarly, the base station 502 in the serving cell, in which the UE 501 is currently camped, may no longer provide a particular LADN service that had been availed previously or provide new LADN services that were not provided earlier.

If the UE 501 is in the IDLE mode and intends to avail particular LADN service(s), the processor 506 can determine, from the LADN information, the cell(s) that are providing the intended LADN services. The processor 506 can measure the strength and/or quality of the cells that are providing the LADN services. The UE 501 can prioritize cells for selection/reselection for camping if the cells provide the intended LADN services and the strength and/or quality of the cells are within the acceptable levels as defined in the 3GPP specification.

If the UE 501 acts as a remote UE (due to inability to connect to the base station 502), the UE 501 can avail intended LADN services through the relay UE 505. The relay UE 505 can broadcast a relay announcement message (discovery message) that indicates capability of the relay UE 505 to provide LADN service and availability of LADN service that the UE 501 intends to avail. In an embodiment, the information about LADN service capability and availability can be broadcasted in a 'spare bit' field of an existing relay announcement message. The UE 501 (acting as the remote UE) can receive the relay announcement message and determine whether the relay UE 505 is providing the LADN services that are intended. The processor 506 can measure the strength and/or quality of the signals received from the relay UE 505. If the relay UE 505 provides the intended LADN services and the strength and/or quality of the signals received from the relay UE 505 is acceptable, the UE 501 can select the relay UE 505 to avail LADN services.

In an embodiment, the processor 506 can broadcast a relay query message to relay UEs (including the relay UE 505) in the serving cell. The relay query message can indicate the LADN services that are intended to be availed by the UE 501. The processor 506 can include the information about the LADN services that are intended to be availed in a 'spare bit' field of the relay query message. Consider that multiple relay UEs respond to the relay query message from the UE 501 by sending respective relay query response messages. The relay query response messages can include information on whether the intended LADN services are provided and the signal power/quality of the relay UEs. On receiving the relay query response messages from the relay UEs, the UE 501 can select the relay UE (say 505) if the relay UE 505 provides the intended LADN services and the signal power/quality is within the acceptable level or the signal power/quality greater than the relay UEs providing the intended LADN services.

The UE 501 can prioritize relay UEs based on whether the relay UEs provide the intended LADN services regardless of signal strength/quality. However, if the UE 501 is able to determine that multiple relay UEs provide the intended LADN services through the respective relay announcement or the relay query response messages, the UE 501 may select a relay UE having better signal strength/quality for receiving the intended LADN services.

If the UE 501 operating in the CONNECTED mode is moving towards an edge of the serving cell, the processor 506 can perform measurements of signal power/quality of neighboring cells. The base station 502 can indicate the UE 501 to perform signal power/quality measurement. The processor 506 can identify, from the LADN information (in the lookup table), target cells that can provide LADN services that are being currently availed by the UE 501 and that are likely to be availed in the future. The identification is carried out in order to ensure continuity of LADN services that are being currently availed by the UE 501 in an event of handover. Once the target cells have been identified, the UE 501 can send a measurement report to the base station 502 including target cells that can provide the intended LADN services. Thus, the UE 501 can prioritize cells for target cell selection based on whether the cells provide LADN services to the UE 501.

In an embodiment, when the UE 501 registers with the AMF 503, the UE 501 can send a REGISTRATION request (PDU session establishment) to the AMF 503. The AMF 503 can provide the LADN information to the UE 501. The UE 501 can inform the AMF 503 about subscribed (currently availed) LADN services and LADN services that can be expected to be subscribed/availed in the future. When the UE 501 is camped in the base station 502, after a LADN service request from the UE 501 is accepted, the AMF 503 can send a current LADN services subscription list to the base station 502. When the UE 501 sends the measurement report to the base station 502, the base station 502, aware of the LADN services expected by the UE 501, chooses a target cell for handover. The target cell can be chosen from amongst neighboring cells which can provide the intended LADN services and the signal power/quality of the chosen target cell can be the best amongst that of the neighboring cells. The base station 502 can share UE 501 context along with information about the LADN services subscription list of the UE 501 to a base station in the target cell after handover through X2 interface. Once the handover is completed, the UE 501 can update the lookup table.

In another embodiment, when the UE 501 is camped in the base station 502, the UE 501 can inform the base station 502 about the LADN services that are subscribed by the UE 501 and the LADN services that are likely to be subscribed/availed by the UE in the future. When the UE 501 sends the measurement report to the base station 502, a target cell is chosen for handover. The base station 502 can share UE 501 context along with information about the LADN services subscription list of the UE 501 to a base station in the target cell after handover. Once the handover is completed, the UE 501 can update the lookup table.

If the UE 501, availing a first LADN service from the base station 502, intends to avail a second (another) LADN service that is not provided by the serving cell, the processor 506 can initiate cell aggregation/secondary cell addition. The processor 506 can identify a cell, based on the LADN information, which provides the second LADN service. Once the cell providing the second LADN service is identified, the processor can send a PDU establishment request to the cell to initiate secondary cell addition.

The processor 506 can send a service request to the base station 502 to enable the UE 501 to avail LADN services from the serving cell and the secondary cell, which provides the second LADN service. The base station 502 can forward the service request to the AMF 503. If the AMF 503 accepts the service request, the base station 502 can add the secondary cell and send a radio resource control (RRC) reconfiguration message to the UE 501, informing that the secondary cell has been added. Once the secondary cell is added, the UE 501 can avail the second LADN service from a base station in the secondary cell while receiving the first LADN service through the base station 502.

The processor 506 can predict whether a paging message received by the UE 501 is relevant to a LADN service (considering the UE 501 is in the IDLE mode). If it is predicted that the paging message is relevant to the LADN service, the processor 506 can send a service request to the base station 502 to enable the UE 501 to avail the LADN service relevant to the paging message. If the serving cell does not provide the LADN service relevant to the paging message, the processor 506 can fetch the LADN information to identify a cell that provides the LADN service at that same location. If the cell providing the LADN service is found, the processor 506 can send a service request to the cell providing the LADN service. The UE 501 can start availing the LADN service if the service requested is accepted by a base station in the cell providing the LADN service.

The processor 506 can detect whether the UE 501 is located at an edge of an LADN service area. If the UE 501 is located at the edge of an LADN service area or if the processor 506 is able to predict the movement of the UE 501 outside the LADN service area (based on a location history), the processor 506 can download data relevant to a LADN service provided in the LADN service area and store the downloaded data in a buffer in the memory 507. The size of the buffer may be fixed. Therefore, the buffer can store a predefined amount of data that the processor 506 downloads.

The processor 506 can detect whether the UE 501 is outside the LADN service area. If it is determined that the UE 501 had moved out of the LADN service area, the processor 506 can utilize the downloaded data, stored in the buffer, to enable the UE 501 to continue availing the LADN service that was being provided in the LADN service area. If the amount of downloaded data stored in the buffer is below a predefined threshold, the processor 506 can periodically determine whether the UE 501 is moved into the LADN service area. If the UE 501 is still outside the LADN service area, the processor 506 can send a PDU establishment request to a base station outside the LADN service area. On the other hand, if it is determined that the UE 501 has moved backed into the LADN service area, the processor 506 can resume downloading.

Thus, the processor 506 refrains from deactivating a LADN PDU (that was established when the UE 501 registered with the base station 502 for availing the LADN service) for a period until the downloaded data is utilized, if the processor 506 can predict that the UE 501 is likely to move back to the LADN service area.

FIG. 5 shows exemplary units of the system 500, but it is to be understood that other embodiments are not limited thereon. In other embodiments, the system 500 may include a greater or fewer number of units. Further, the labels or names of the units are used only for illustrative purpose and does not limit the scope of the invention. One or more units can be combined together to perform same or substantially similar function in the system 500.

Figure 6:
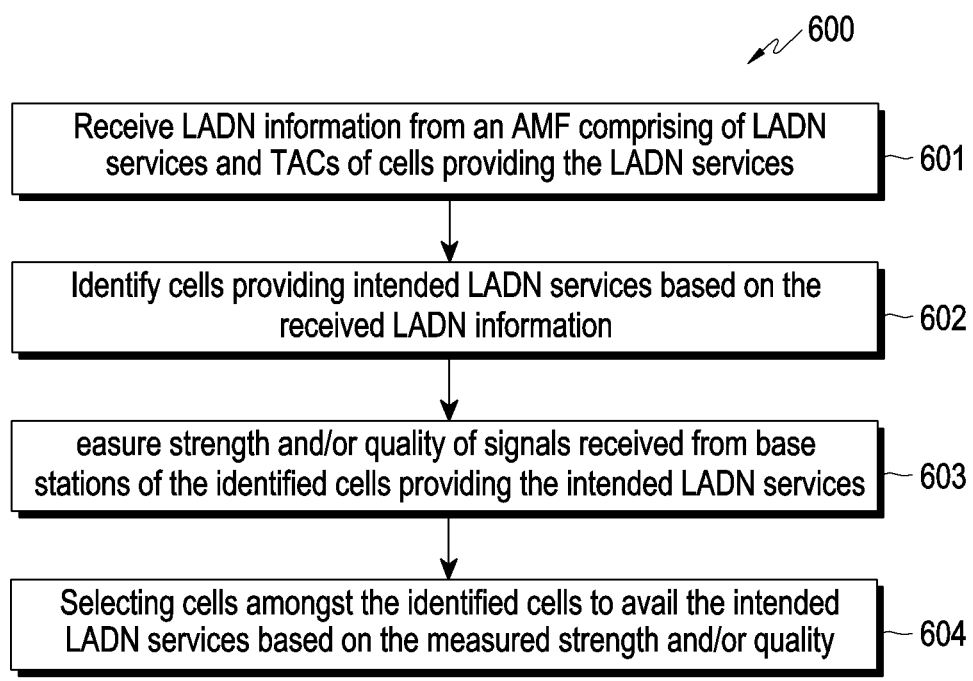
FIG. 6 is a flowchart depicting a method for prioritizing selection of cells based on availability of LADN services, according to embodiments.

FIG. 6 is a flowchart 600 depicting a method for prioritizing selection of cells based on availability of LADN services, according to embodiments. At step 601, the method includes receiving LADN information from the AMF 503 comprising of LADN services and TACs of cells providing the LADN services. The LADN information can be stored in the server 504 and the database of the UE 501. When the UE 501 registers with a cell providing LADN services that are intended to be availed by the UE 501, the UE 501 can update the lookup table. The lookup table is obtained by consolidating the LADN information stored in the server 504 and the database. The LADN information can be obtained by the UE 501 to select a cell for availing the intended LADN services, when the UE 501 is operating in the IDLE mode.

At step 602, the method includes identifying cells that are providing the intended LADN services. The UE 501 can utilize the LADN information and determine the TACs of the cells that are providing the intended LADN services. The UE 501 can identify a single or a plurality of cells to avail a single or a plurality of LADN services. At step 603, the method includes measuring strength (reference signal received power (RSRP)) and quality (reference signal received quality (RSRQ)) of signals received from base stations of the identified cells that are providing the intended LADN services. The UE 501 measures the signal strength and quality of only those cells that provide the LADN services that are intended by the UE 501. This allows faster selection of cells.

At step 604, the method includes selecting cells amongst the identified cells to avail the intended LADN services. The UE 501 selects the cells based on the measured strength and/or quality. If a plurality of cells, providing the intended LADN services, is identified, the UE 501 can select a cell with a better signal strength and quality.

The various actions in the flowchart 600 may be performed in the order presented, in a different order, or simultaneously. Further, in some embodiments, some actions listed in FIG. 6 may be omitted.

Figure 7:
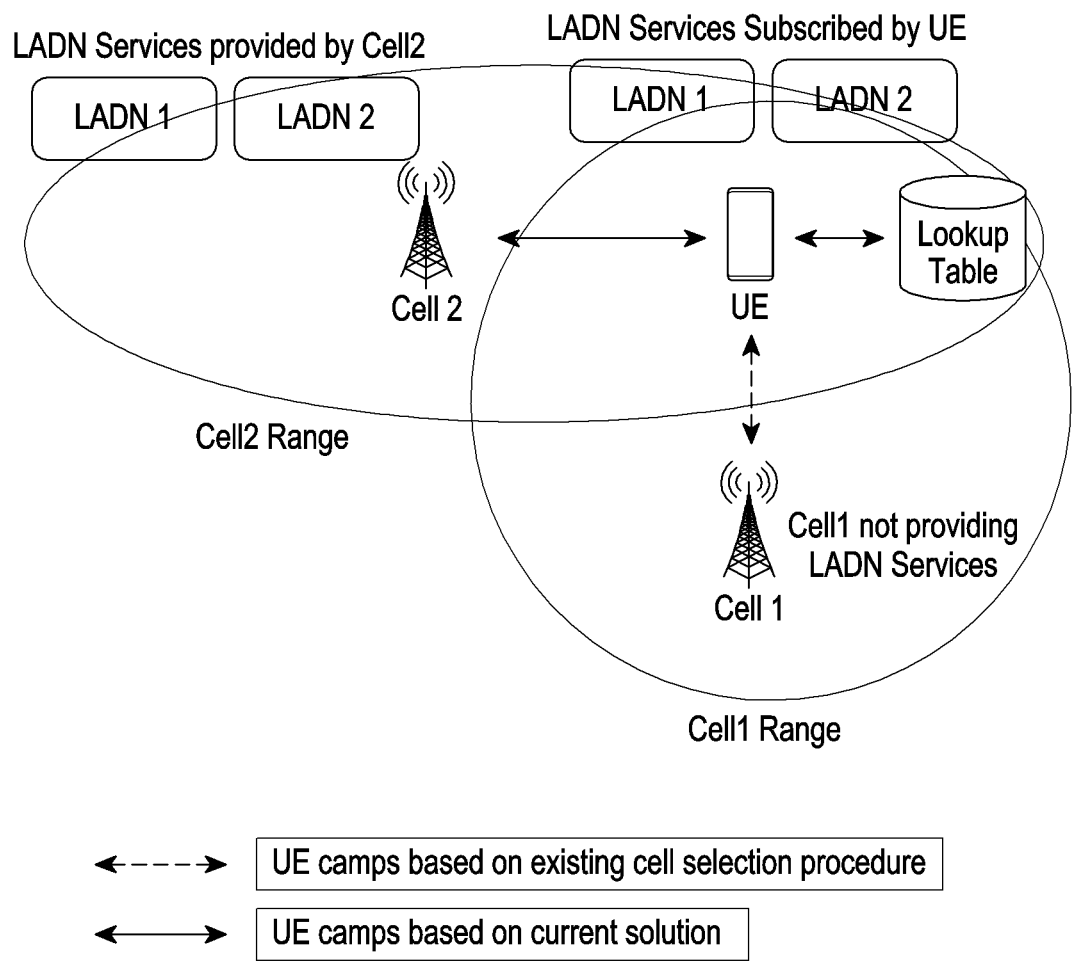
FIG. 7 is an example scenario depicting prioritization of cell selection based on availability of LADN services, according to embodiments.

FIG. 7 is an example scenario depicting prioritization of cell selection based on availability of LADN services, according to embodiments. Consider that the UE 501 is subscribed to LADN 1 and LADN 2 services. The coverage areas of cell 1 and cell 2 are overlapping. The cell 1 does not provide LADN services. The cell 2 provides the LADN 1 and LADN 2 services. When the UE 501 registers with the AMF 503, the UE 501 obtains LADN information comprising of the list of LADN services, and the associated TACs in which the LADN services are available. The UE 501 includes a lookup table, which can store the LADN information. The lookup table can be updated each time the UE 501 registers with a base station of a cell providing the LADN services. The LADN information can be stored in the UE database, a server, a cloud, and so on.

In the IDLE mode, the UE 501 can measure the signal strength of the different (neighboring) cells. The UE 501 can measure signal strength of those cells which provide the intended LADN services to the UE 501. Thus, the cells providing the LADN services are prioritized for selection. The UE 501 can determine whether a cell can provide the intended LADN services based on the LADN information. The UE 501 can select a cell to camp that is providing the LADN services if the strength and/or quality of the signals received from a base station of the cell is within acceptable levels. As depicted in FIG. 7, the UE prioritizes cell 2 over cell 1, and camps in cell 2, as cell 2 provides support for the intended LADN services 1 and 2; even if the signal strength and quality of cell 1 is better than that of cell 2 and cell 2 is having acceptable signal strength or quality.

Figure 8:
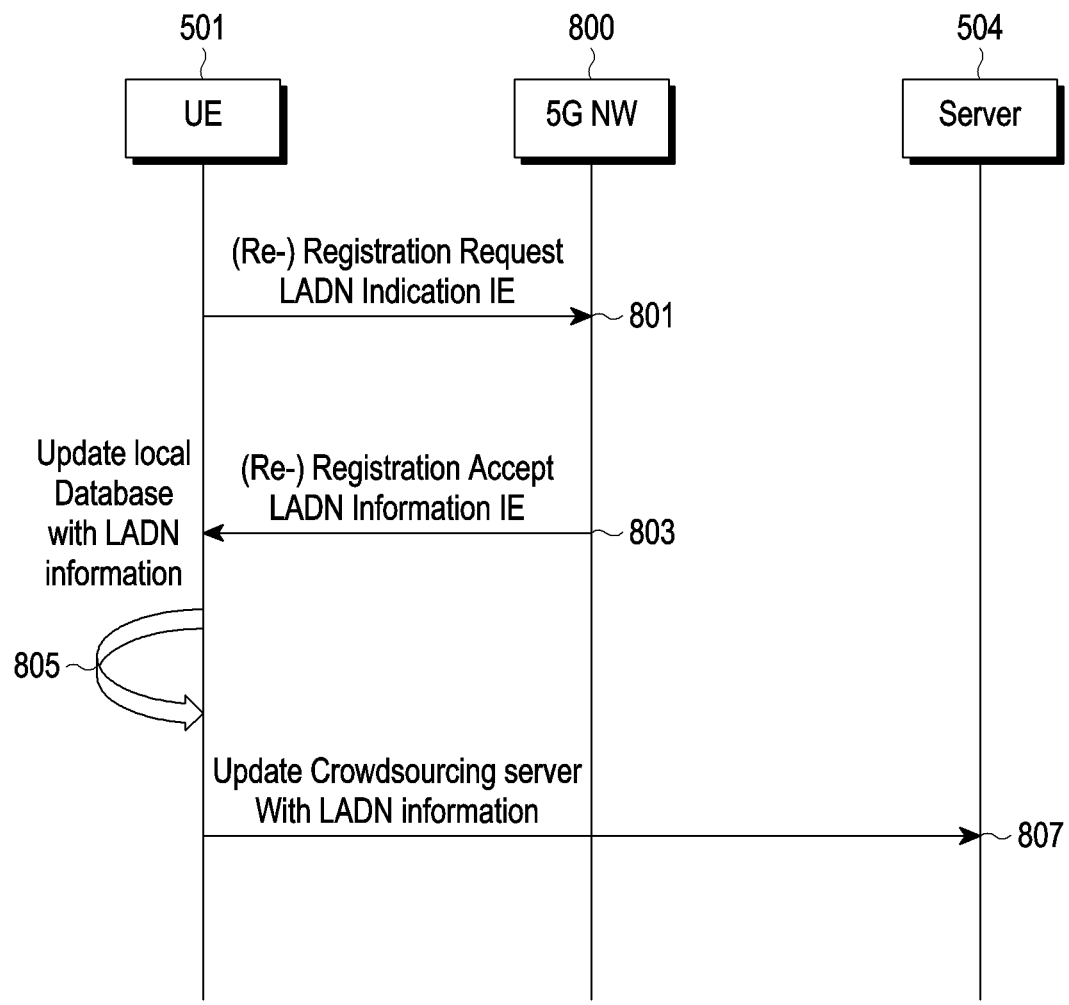
FIG. 8 is a sequence diagram depicting retrieval of LADN information and storing the LADN information in a server, according to embodiments.

FIG. 8 is a sequence diagram depicting retrieval of LADN information and storing the LADN information in a server 504, according to embodiments. As depicted in FIG. 8, at step 801, the UE 501 sends a registration request to a 5G core network 800 and indicates the core network an intention to avail LADN services using a LADN indication information element. At step 803, the 5G core network (AMF 503) can accept the registration request and send LADN information to the UE 501 indicating the supported LADN services and the TACs in which the LADN services can be availed by the UE 501. At step 805 and step 807, the UE 501 can update the lookup table (a local database in the UE 501) and update existing LADN information stored in the server 504. In an example, the server 504 can be a crowd sourcing server.

Figure 9A:
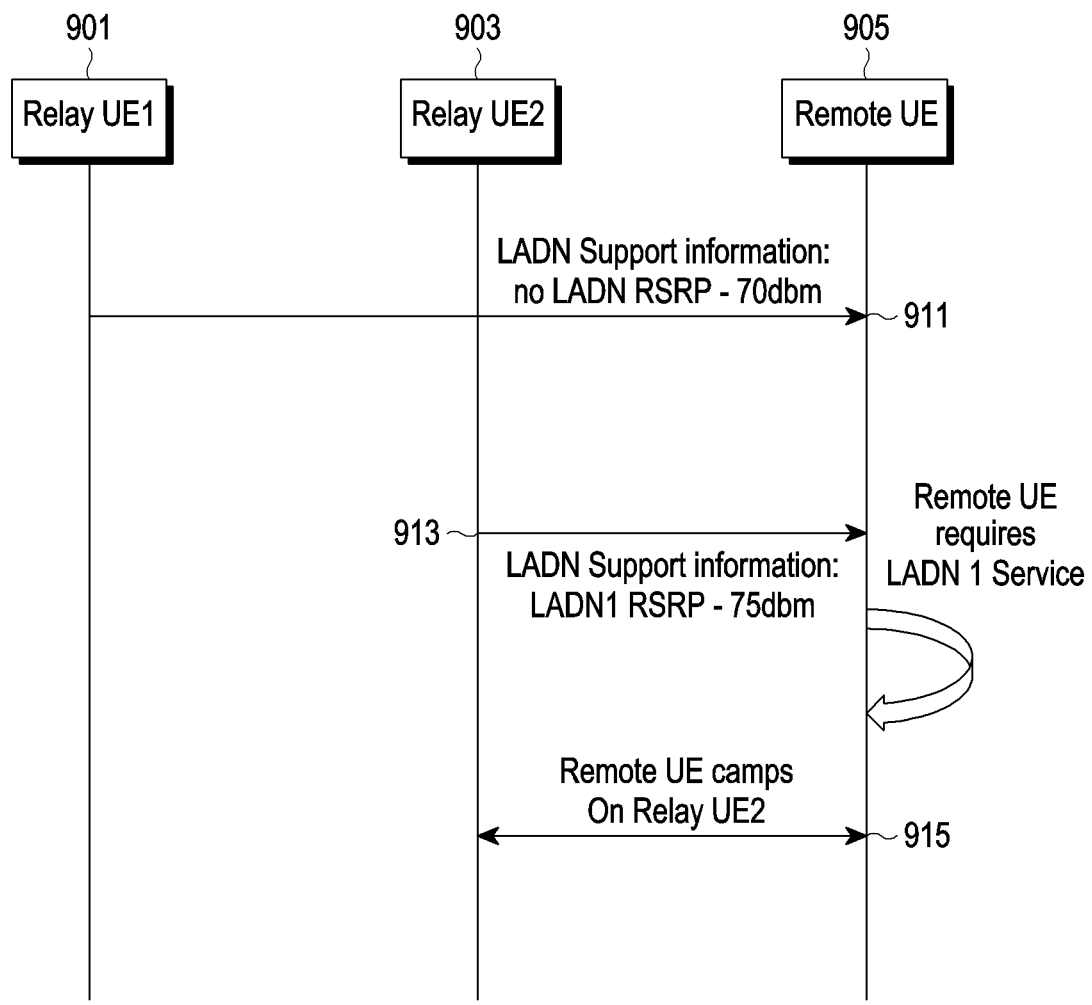
FIGS. 9a and 9b are sequence diagrams depicting selection of a relay UE for receiving LADN services, according to embodiments.
Figure 9B:
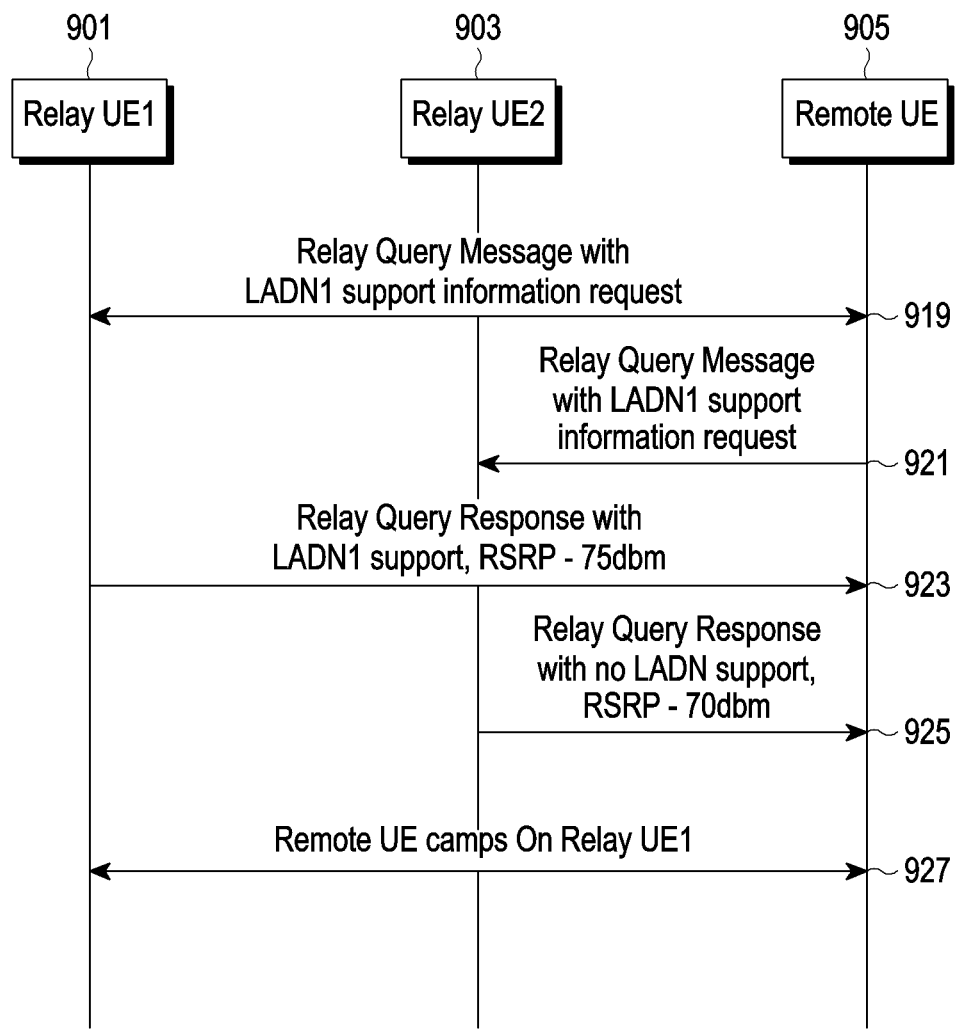

FIGS. 9a and 9b are sequence diagrams depicting selection of a relay UE (such as the relay UE 505) for receiving LADN services, according to embodiments. The embodiments include prioritizing selection of relay UEs based on whether the relay UEs provides LADN services. In an embodiment, the relay UEs can indicate availability of LADN services in an initial discovery message. The relay UEs can indicate the availability of LADN services using bits in a 'spare' bit field in a relay announcement message. The UEs acting as remote UEs (such as the UE 501) can retrieve the LADN service availability (LADN services provided by the relay UEs) from the relay announcement messages. Based on availability of the LADN services, retrieved from the relay announcement messages, the UE 501 can prioritize relay UEs for reception of LADN services.

As depicted in the example in FIG. 9a, two relay UEs, viz., relay UE 1 901 and relay UE 2 903, are capable of providing relay services from a base station or a network to a remote UE 905. Consider that the remote UE 905 intends to avail a LADN 1 service. The relay UE 1 901 does not support any LADN service, whereas relay UE 2 903 provides the LADN 1 service. At step 911, the two relay UEs 901, 903 can broadcast relay announcement messages indicating LADN service availability and support. In an embodiment, based on LADN information stored in the lookup table of the remote UE 905, the remote UE 905 can prioritize selection of relay UEs 901, 903 for receiving the intended LADN services. In another embodiment, the remote UE 905 can prioritize selection of the relay UEs 901, 903 for receiving LADN services based on content in the 'spare' bit field of the relay announcement messages received from the relay UE 1 901 and the relay UE 2 903. The remote UE 905 can measure power and quality of signals received from the relay UE 1 901 and the relay UE 2 903. For example the RSRP of the signals received from the relay UE 1 901 is −70 dBm. The RSRP of the signals received from the relay UE 2 903 is -75dBm. At step 915, the remote UE 905 can select the relay UE 2, even though RSRP is lower than that of the relay UE 1 901 and camps on relay UE 2 903. This is because the LADN 1 service is provided by the relay UE 2 903.

In an embodiment, a remote UE can transmit a relay query message, in which the remote UE can indicate the LADN services that the remote UE intends to receive. The remote UE can request the relay UEs to advertise the LADN services provided by the relay UEs. The remote UE can indicate the LADN services, that the remote UE intends to receive, using bits in a 'spare' bit field in the relay query message. A relay UE providing the intended LADN services on receiving the relay query message can send a relay response query message indicating availability of the intended LADN services. The relay UEs can indicate LADN information using bits in a 'spare' bit field in the relay response query message. The remote UE can select the relay UE providing the intended LADN services.

As depicted in the example in FIG. 9b, at step 919, the remote UE 905 broadcasts a relay query message, which is received by the relay UE 1 901 and the relay UE 2 903. At step 921, the remote UE 905, in the relay query message, indicates the LADN services that are intended for reception. At step 923 and 925, on receiving the relay query message, the relay UE 1 901 and the relay UE2 903 sends a relay response query message indicating availability or non-availability of the intended LADN services. At step 927, consider that the remote UE 950 intends to avail a LADN 1 service and camps on relay UE 1 901. The relay response query message from the relay UE 1 901 indicates that the LADN 1 service is supported and the RSRP is -75dBm. The relay response query message from the relay UE 2 903 indicates that the LADN 1 service is not supported and the RSRP is -70dBm. The information of whether the intended LADN service is supported by the relay UEs 901, 903 can be ascertained based on the content of the 'spare' bit field of the relay response query messages received from relay UE 1 901 and relay UE 2 903. As the remote UE 905 can prioritize selection of relay UEs 901, 903 based on whether the intended LADN services are provided by the relay UE, the remote UE 905 can select the relay UE 1 901, even though RSRP is lower than that of relay UE 2 903.

Figure 10A:
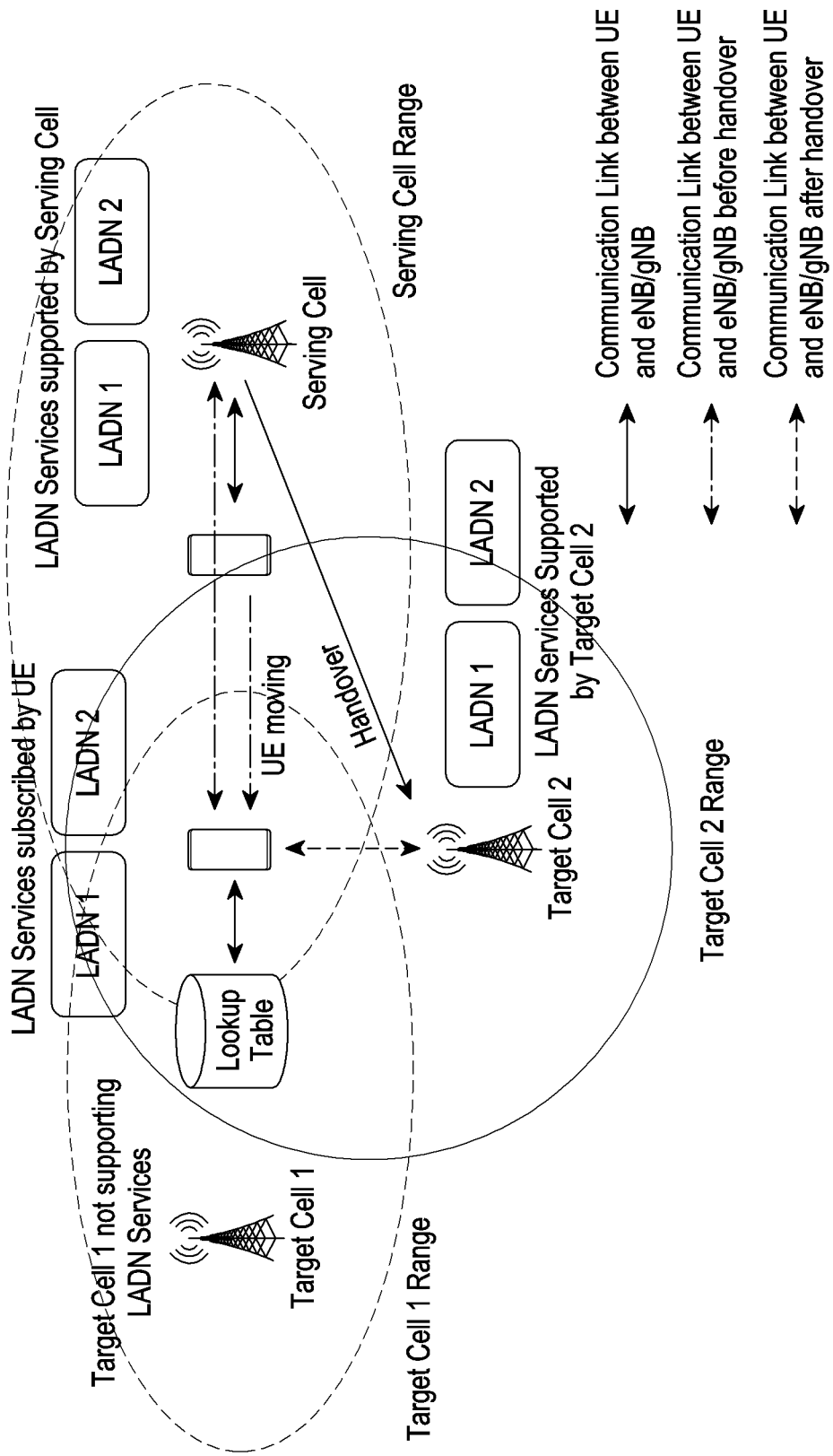
FIG. 10a is an example selection of a target cell for handover based on availability of LADN services in the target cell, according to embodiments.

FIG. 10a is an example selection of a target cell for handover based on availability of LADN services in the target cell, according to embodiments. As depicted in FIG. 10a, consider that the UE 501 is currently camped in a serving cell. The UE 501 is availing LADN 1 and LADN 2 services provided by the serving cell. Consider that the handover procedure is managed by a base station in the serving cell. As the UE 501 moves towards the edge of the serving cell the UE 501 can perform measurement of signal power and signal quality of neighboring cells, viz., cell 1 and cell 2. Consider that the lookup table in the UE 501 includes LADN information which specifies LADN services, TACs of the cells that provide by the LADN services, and physical ID of the cells. Based on the LADN information, the UE 501 can determine that the cell 2 provides the LADN 1 and LADN 2 services, whereas the cell 1 does not provide any LADN service. Therefore, the UE 501 performs measurement of signals from cell 2 and reports the measurement to the base station of the serving cell. The serving cell can perform the handover procedure and the UE 501 camps on cell 2. If the UE 501 sends measurements of a plurality of cells providing the intended LADN services, the base station of the serving cell can choose the target cell amongst the plurality of cells. The UE 501 can update the lookup table after registering with cell 2. This facilitates faster selection of the target cell in the future, as the UE 501 will be aware of status of availability of LADN services in different cells. Thus, continuity of LADN services subscribed by the UE 501 can be ensured after handover.

Figure 10B:
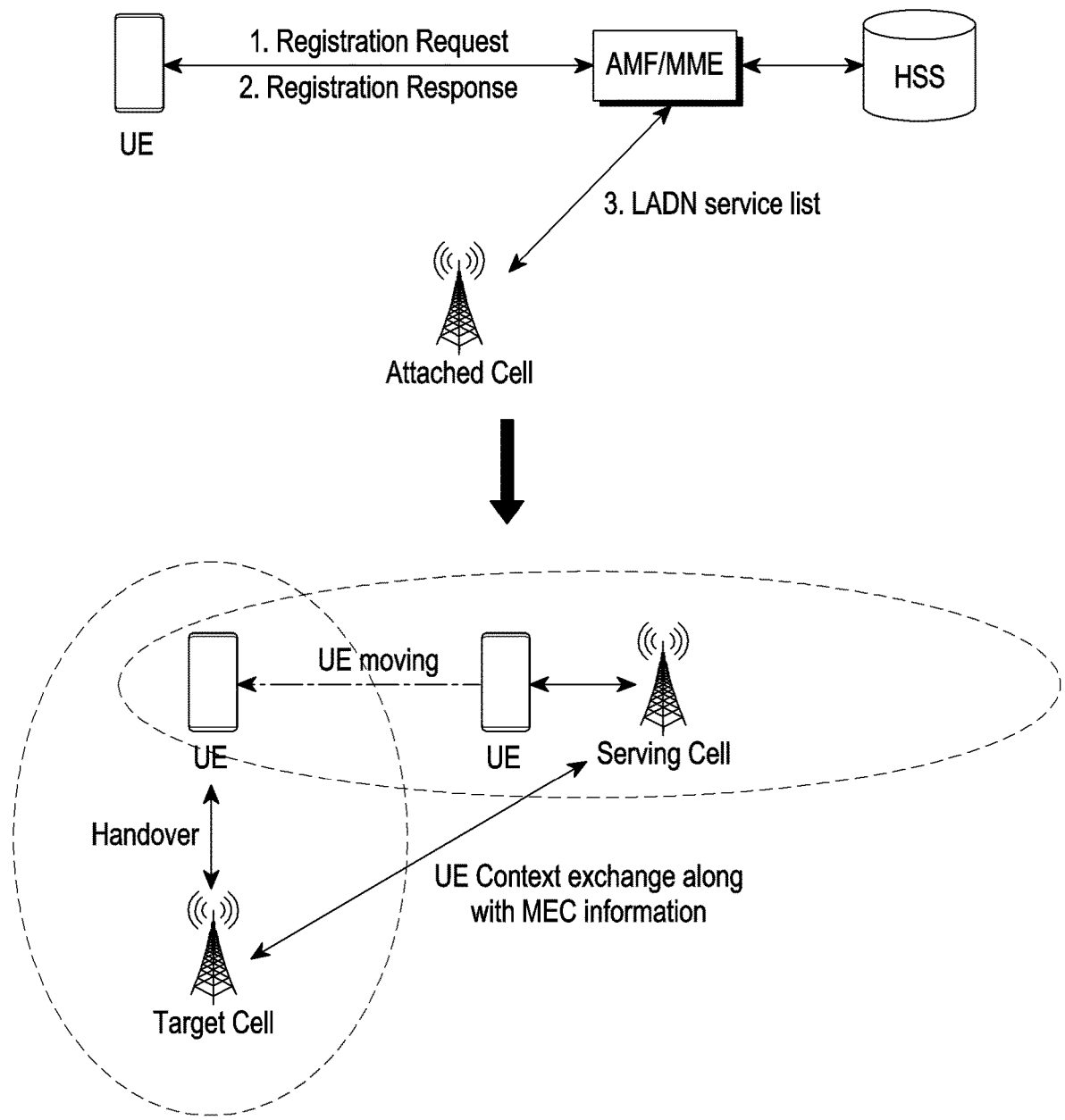
FIG. 10b is an example selection of a target cell for handover based on availability of LADN services in the target cell, according to embodiments.

FIG. 10b is an example selection of a target cell for handover based on availability of LADN services in the target cell, according to embodiments. As depicted in FIG. 10b, consider that the UE 501 sends a registration request to the AMF 503 to register with a cell (It can be inferred that the cell supports or provides LADN services intended by the UE 501). The AMF 503 can accept the registration request and the UE 501 can camp on the cell (serving cell). The AMF 503 can determine, from a home subscriber server (HSS), LADN service requirements (LADN services subscribed to by the UE 501) of the UE 501 such as LADN services that the UE 501 is currently subscribed to and LADN services intended for reception by the UE 501 in the future.

The AMF 503 can inform LADN service requirements of the UE 501 to the base station of the serving cell. The handover procedure is managed by a base station of the serving cell. As the UE 501 moves towards the edge of the serving cell, the UE 501 performs measurement of signal strength and quality of the neighboring cells. The UE 501 can send a report of the measurement and the base station in the serving cell can choose a target cell that can provide the LADN services desired by the UE 501 after handover from the serving cell. The base station in the serving cell can be aware of the LADN services supported by base stations in other cells through the X2 interface. The base station in the serving cell can communicate the LADN requirements of the UE 501 and UE context to the base station of the target cell, through the X2 interface, during the handover procedure.

Figure 10C:
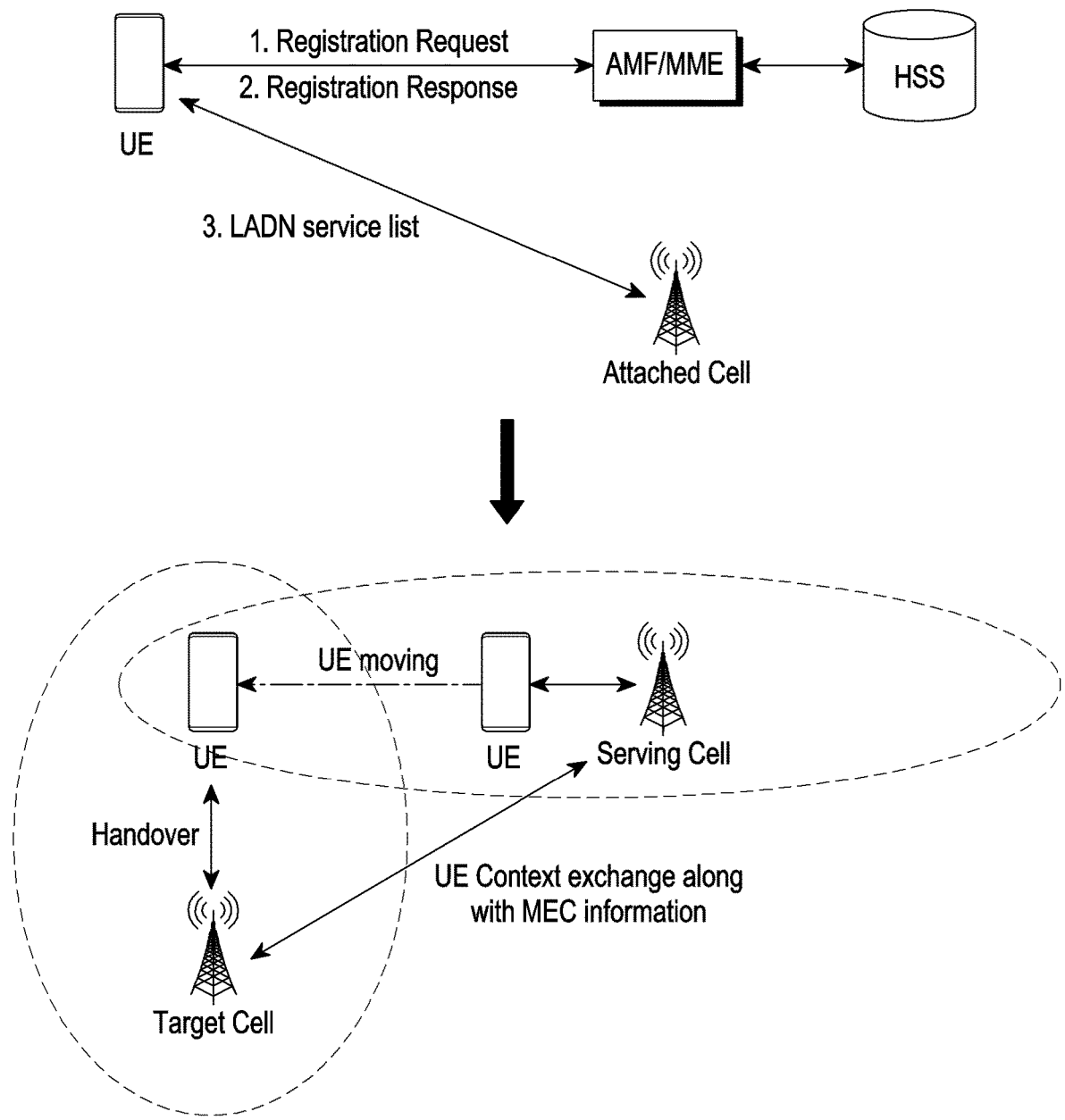
FIG. 10c is yet another example selection of a target cell for handover based on availability of LADN services in the target cell, according to embodiments.

FIG. 10c is yet another example selection of a target cell for handover based on availability of LADN services in the target cell, according to embodiments. As depicted in FIG. 10c, consider that the UE 501 sends a registration request to the AMF 503 to register with a cell providing LADN services intended by the UE 501. The AMF 503 can accept the registration request and the UE 501 can camp on the cell (serving cell). Once the UE 501 camps on the serving cell, the UE 501 can send its LADN service requirements (LADN services that the UE 501 is currently subscribed to and. LADN services intended for reception by the UE 501 in the future) to the base station in the serving cell. The UE 501 can send the LADN service requirements to the base station of the serving cell either during PDU session request or during RRC reconfiguration.

As the UE 501 moves towards the edge of the serving cell, the UE 501 performs measurement of signal strength and quality of the neighboring cells. The UE 501 can send a report of the measurement and the base station in the serving cell can choose a target cell that can provide the LADN services desired by the UE 501 after handover from the serving cell. The base station in the serving cell can communicate the LADN requirements of the UE 501 and the UE context to the base station of the target cell through X2 interface during the handover procedure.

Figure 11A:
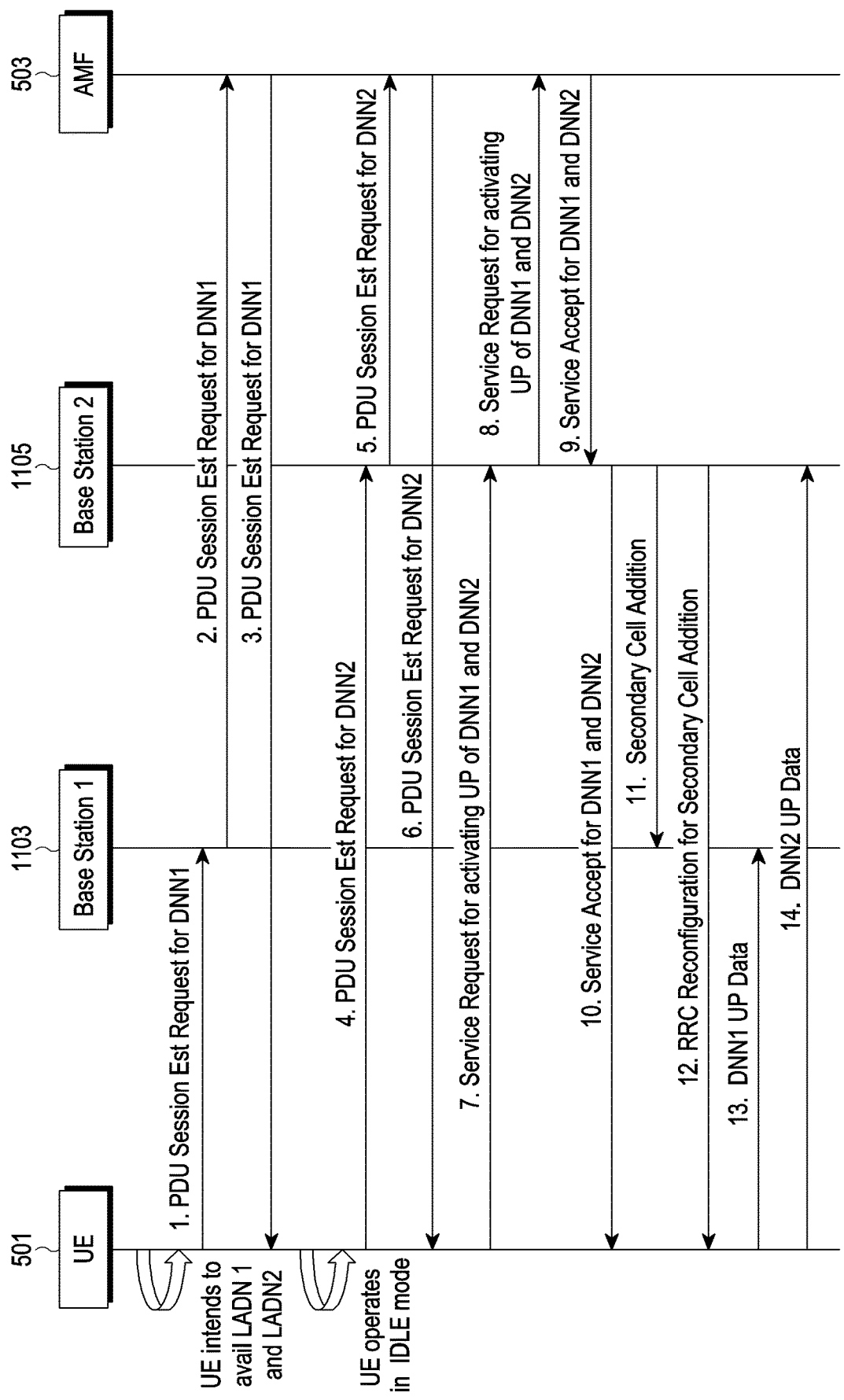
FIG. 11a is a sequence diagram depicting enablement of the UE to simultaneously avail LADN services from multiple cells, according to embodiments.

FIG. 11a is a sequence diagram depicting enablement of the UE 501 to simultaneously avail LADN services from multiple cells, according to embodiments. Consider that the UE 501 intends to avail LADN 1 and LADN 2 services. The LADN 1 service is provided by the base station 1 1103 and the LADN 2 service is provided by the base station 2 1105. In an embodiment, at step 1 and step 4, the UE 501 can send PDU session establishment requests to the base stations 1103, 1105 in order to register with the base stations 1103, 1105. At step 2 and step 5, The base stations 1103, 1105 can forward the PDU session establishment requests to the AMF 503. At step 3 and step 6, The AMF 503 can send PDU session establishment responses to the UE 501.

Consider that a cell including the base station 2 1105 acts as the primary cell and the cell including the base station 1 1101 acts as the secondary cell. At step 7, the UE 501 can send a service request to the base station 2 1105 for receiving the LADN 1 and LADN 2 services from the base station 1 1101 and base station 2 1105 respectively (as the base station 2 1105 is included in the primary cell). At step 8, the base station 2 1105 can forward the service requests request to the AMF 503. At step 9, the AMF 503 can send a service (LADN service) accept message as a response to the base station 2 1105. At step 10, the base station 2 1105 can forward the service accept response from the AMF 503 to the UE 501. Thereafter, at step 11, the base station 2 1105 allows adding the secondary cell, i.e., enable the UE 501 to receive LADN 1 service from the base station 1. In an embodiment, at step 12, the base station 2 can send a RRC reconfiguration message for addition of the secondary cell. Thereafter, at step 13 and step 14, the UE 501 can avail LADN services (LADN 1 and LADN 2) from the base station 1 1101 and the base station 2 1105.

Figure 11B:
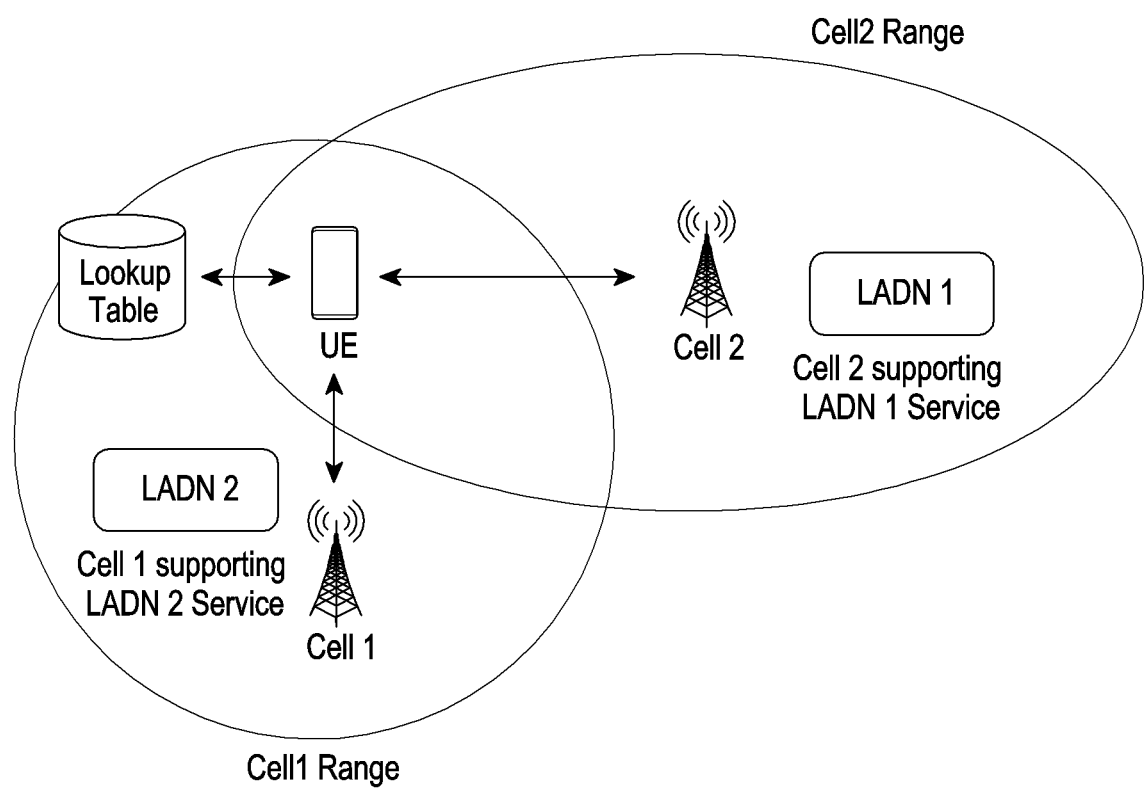
FIG. 11b is an example scenario, wherein the UE is simultaneously receiving two LADN services from two cells, according to embodiments.

FIG. 11b depicting an example scenario, wherein the UE 501 is simultaneously receiving two LADN services from two cells, according to embodiments. As depicted in FIG. 11b, the UE 501 is located in an area which is within coverage area of cell 1 and cell 2. The cell 1 is providing a LADN 2 service and the cell 2 is providing a LADN 1 service. Consider that the UE 501 initially the UE 501 is camped in cell 2 and is availing LADN 1 service. After a period of time, the UE 501 may intend to receive LADN 2 service. The lookup table in the UE 501 may include LADN information pertaining to the LADN services provided by different cells. Based on the LADN information the UE 501 can determine that the LADN 2 service is provided by the cell 1. If the LADN information is not included in the LADN information, the UE 501 may request the LADN information from the AMF 503, which can indicate the available LADN services and the TACs in which the LADN services are available. Once, the LADN information is acquired by the UE 501, the UE 501 can send a PDU session establishment request to the base station of cell 2 (considering cell 2 to be the primary cell). If the request is accepted by the base station by sending a PDU session establishment response, the UE 501 can send a service request to the base station of cell 2 to avail the LADN 2 service from cell 1. The base station of cell 2 allows adding the cell 1 and, thereafter, the UE 501 can avail the LADN 2 service from the cell 1 while availing the LADN 1 service from the cell 2.

Figure 12:
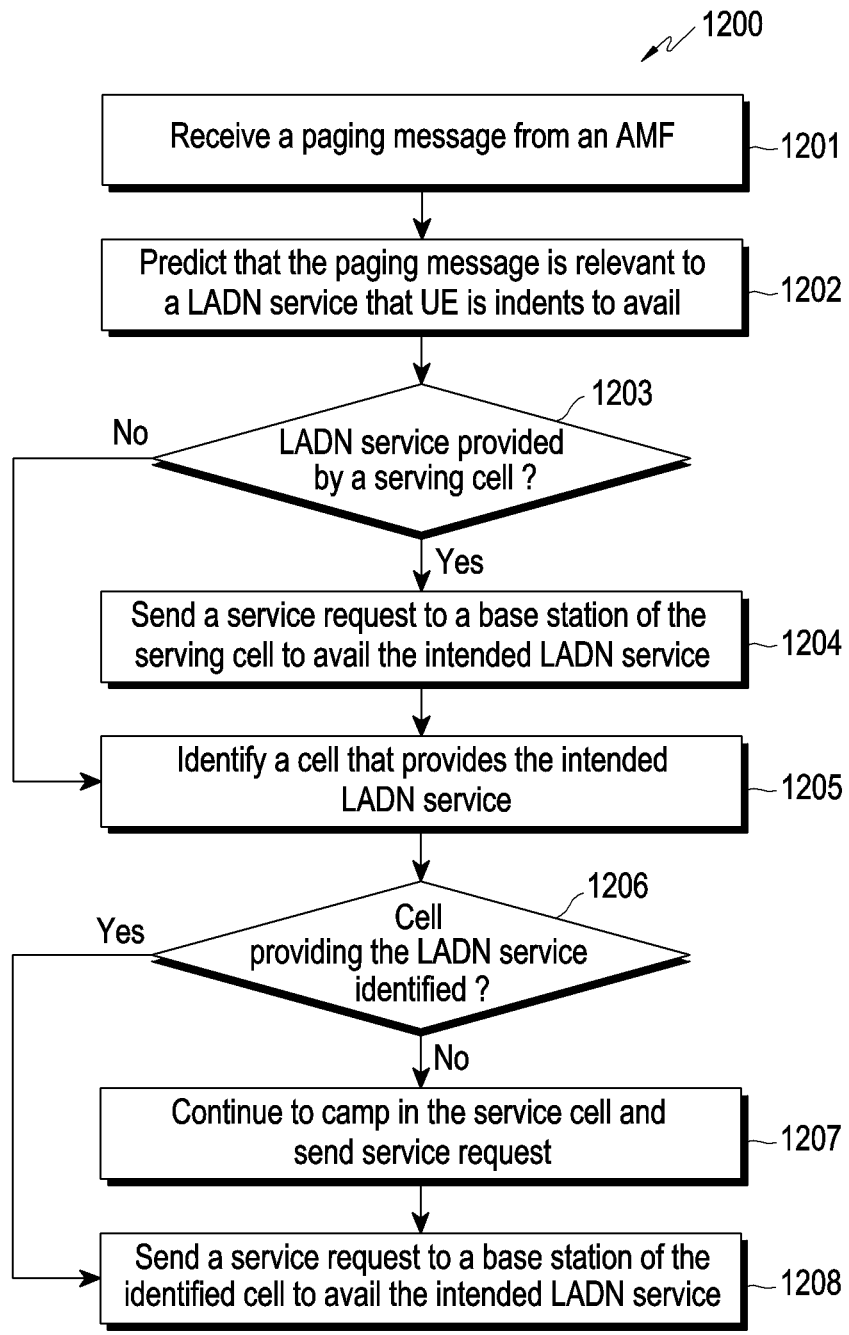
FIG. 12 is a flowchart depicting a method for sending a service request for availing an intended LADN service on receiving a paging message relevant to the LADN service, according to embodiments.

FIG. 12 is a flowchart 1200 depicting a method for sending a service request for availing an intended LADN service on receiving a paging message relevant to the LADN service, according to embodiments. At step 1201, the method includes receiving a paging message from the AMF 503. At step 1202, the method includes predicting that the paging message is relevant to a LADN service that is indented to be availed by the UE 501. The UE 501 can check the lookup table in the UE 501 in order to determine whether the paging message is relevant to the intended LADN service that the UE 501 is intending to avail. The determination can be carried out using LADN service usage history stored in the UE 501.

At step 1203, the method includes determining whether the LADN service, to which the received paging message belongs, is provided by a serving cell, in which the UE 501 is currently camped. Once the UE 501 determines the paging message is relevant to the intended LADN service, the UE 501 determines whether the relevant service is provided by the serving cell. On determining that the intended LADN service is provided by the serving cell, the method includes, at step 1204, sending a service request to the base station of the serving cell to avail the intended LADN service.

On the other hand, if it is determined that the intended LADN service is not provided by the serving cell, the method includes, at step 1205, identifying a cell that provides the intended LADN service. The UE 501 can utilize the LADN information stored in the lookup table to determine the cell that provides the intended LADN service. At step 1206, the method includes determining whether a cell providing the intended LADN service is identified. If the cell providing the intended LADN service is not found, the method includes, at step 1207, continuing to camp in the serving cell and sending service requests. On the other hand, if the cell providing the intended LADN service is identified, the method includes, at step 1208, sending a service request to the identified cell to avail the intended LADN service.

The various actions in the flowchart 1200 may be performed in the order presented, in a different order, or simultaneously. Further, in some embodiments, some actions listed in FIG. 12 may be omitted.

Figure 13:
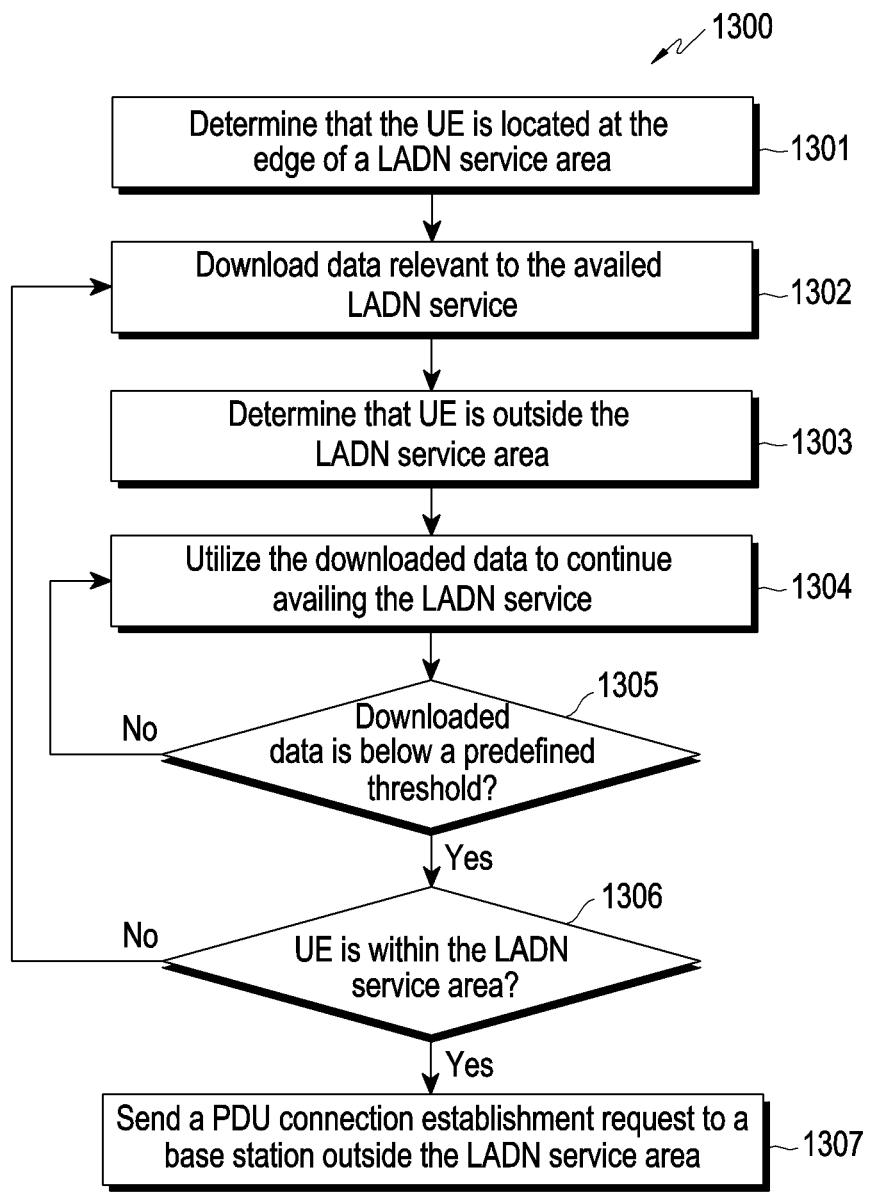
FIG. 13 is a flowchart depicting a method for managing data buffering if the UE is located at an edge of a LADN service area, according to embodiments.

FIG. 13 is a flowchart 1300 depicting a method for managing data buffering if the UE 501 is located at an edge of a LADN service area, according to embodiments. At step 1301, the method includes determining that the UE 501 is located at the edge of a LADN service area. The coverage area of a serving cell can include service area of at least one LADN service. The LADN service area can be part of coverage area of multiple cells (including the serving cell). Consider that the UE 501 is availing a LADN service and the LADN service area is within the coverage area of the serving cell. The LADN service area can also extend beyond the coverage area of the serving cell.

At step 1302, the method includes downloading data relevant to the availed LADN service, wherein the amount of downloaded data is within a predefined buffer data limit. At step 1303, the method includes determining that UE 501 is outside the LADN service area. At step 1304, the method includes utilizing the downloaded data to continue availing the LADN service. At step 1305, the method includes determining if the downloaded data is below a predefined threshold. If the amount of buffered data in is not below a predefined threshold, the UE 501 continues to utilize the buffered data. The UE 501 refrains from establishing a PDU connection request (Internet PDU) if the amount of buffered data in is not below the predefined threshold. This can minimize signaling overhead.

On the other hand, if the amount of buffered data is below the predefined threshold, the method includes, at step 1306, determining whether the UE 501 is within the (edge of) LADN service area. If the UE 501 is within the LADN service area, the UE 501 can download data relevant to the availed LADN service. On the other hand, if the UE 501 is still outside the LADN service and the amount of buffered data is below the predefined threshold, the method includes, at step 1307, sending an Internet PDU session establishment request to a base station outside the LADN service area.

The various actions in the flowchart 1300 may be performed in the order presented, in a different order, or simultaneously. Further, in some embodiments, some actions listed in FIG. 13 may be omitted.

Embodiments allow prioritizing selection of cells based on support provided by the cells for LADN services and strength of signal received from the cells, by which UEs can utilize subscribed LADN services when operating in the CONNECTED mode. Embodiments allow storing LADN cell related information in the UEs based on subscription of UEs with LADN services, which allows efficient choosing of cells providing LADN services. Embodiments allow prioritizing target cells for handover based on availability of LADN services, which enable the UEs to seamlessly receive LADN services. Embodiments allow adding secondary cells, which enable the UEs to receive multiple LADN services from multiple cells. Embodiments allow initiating PDU session establishment, if reception of LADN service specific paging messages can be predicted, and send service request after selecting a cell providing the LADN service. Embodiments allow continuing LADN services at the edge of a LADN service area by preventing inclusion of measurement of signals of neighboring cells until serving cell signal strength/quality is below a threshold. Embodiments allow the UEs to access LADN services by prioritizing and selecting relay UEs with LADN capability. Embodiments allow the UEs to download required buffered data prior to the UEs moving out of the LADN service area and preventing establishment of other PDUs prior to the buffering data reduces below threshold storage of buffered data. Embodiments allow the UEs to reduce control signaling overhead and data stalling. Embodiments allow reducing buffer size and optimizing data consumption by allowing the UEs to predict neighboring LADN service areas.

The embodiments disclosed herein can be implemented through at least one software program running on at least one hardware device and performing network management functions to control the network elements. The network elements shown in FIG. 5 include blocks which can be at least one of a hardware device, or a combination of hardware device and software module.

The embodiments disclosed herein describe methods and systems for prioritizing selection/reselection of cells based on availability of LADN services in the cells. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the present disclosure that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the present disclosure has been described in terms of preferred embodiments, those skilled in the art will recognize that the present disclosure can be practiced with modification within the spirit and scope of the embodiments as described herein.

What is claimed is:

1. A method for prioritizing selection of cells in communication system, the method comprising:
   receiving, by a user equipment (UE), from a serving cell, local area data network (LADN) information comprising a type of each of LADN services that are supported by the serving cell and neighboring cells and tracking area codes of the neighboring cells;
   selecting, by the UE, at least one neighboring cell providing at least one intended LADN service among the neighboring cells based on the LADN information;
   identifying, by the UE, a strength and a quality of signals received from the at least one selected neighboring cell;
   connecting, by the UE, to one of the at least one selected neighboring cell when the identified strength and quality of the signals is above a threshold;
   receiving at least one relay announcement message from at least one relay UE informing availability of the at least one intended LADN service, wherein the availability of the at least one intended LADN service is indicated in a spare bit field of the at least one relay announcement message;
   measuring at least one of a strength and a quality of signals received from the at least one relay UE; and
   connecting to the at least one relay UE based on the availability of the at least one intended LADN service and the at least one of the strength and the quality of the signals received from the at least one relay UE.

2. The method of claim 1, wherein the LADN information comprises of at least one currently received LADN service and the at least one intended LADN service, wherein the LADN information is sent to UE by an access and mobility function (AMF) through the serving cell,
   wherein the LADN information is included in a message sent by the AMF as a response to a registration request message sent by the UE, wherein the registration request message includes the LADN service, and
   wherein the LADN information sent by the AMF includes a plurality of LADN service IDs, wherein the UE selects the at least one intended LADN service of the LADN services.

3. The method of claim 1,
   wherein the UE is connected to the one of the at least one selected neighboring cell by sending an at least one service request,
   wherein the method further comprises updating at least one of a lookup table, a database, and a server in the UE including the LADN information after sending the at least one service request to the at least one selected neighboring cell, and
   wherein the threshold is configured by a network.

4. The method of claim 1, further comprising:
   broadcasting a relay query message informing the at least one intended LADN service, wherein the at least one intended LADN service is indicated in a spare bit field of the relay query message;
   receiving at least one relay query response message from at least one relay UE informing availability of the at least one intended LADN service, wherein the availability of the at least one intended LADN service is indicated in a spare bit field of the at least one relay query response message;
   measuring at least one of a strength and a quality of signals received from the at least one relay UE; and
   connecting to the at least one relay UE to avail the at least one intended LADN service based on the availability of the at least one intended LADN service, and the at least one of the strength and the quality of the signals received from the at least one relay UE.

5. The method of claim 2, further comprising:
   detecting that the UE is at an edge of the one of the at least one selected neighboring cell, wherein the one of the at least one selected neighboring cell includes a first base station;
   detecting at least one cell providing a LADN service based on the LADN information;
   measuring at least one of a strength and a quality of signals received from at least one base station of the detected at least one cell; and
   sending the measurements of the at least one of the strength and the quality of the signals received from the at least one base station to the first base station, wherein a cell amongst the detected at least one cell is selected as a target cell for handover based on the measurements.

6. The method of claim 5, wherein the UE sends the LADN service to the first base station, wherein the first base station sends the LADN service to a second base station of the target cell, wherein the AMF sends the LADN service to the first base station, and wherein the first base station sends the LADN service to the second base station of the target cell.

7. The method of claim 1, further comprising:
identifying a secondary cell providing another LADN service based on the LADN information, wherein the one of the at least one selected neighboring cell is a primary cell;
sending a service request to a first base station of the at least one neighboring cell to receive the another LADN service provided by the secondary cell; and
receiving a radio resource configuration (RRC) message indicating an addition of the secondary cell, wherein the addition of the secondary cell indicates enablement of the UE to avail the another LADN service.

8. The method of claim 2, further comprising:
predicting that a paging message, received from the AMF, is relevant to the LADN services;
identifying whether the at least one neighboring cell is providing the LADN services;
sending a service request to the at least one neighboring cell if the at least one neighboring cell is providing the LADN services;
identifying at least one cell providing the LADN services if the at least one neighboring cell is not providing the LADN services; and
camping on the at least one identified cell providing the LADN services.

9. The method of claim 1, further comprising:
downloading, by the UE, data relevant to the at least one intended LADN service upon detecting that the UE is located at an edge of an LADN service area;
upon detecting that the UE has moved out of the LADN service area, availing, by the UE, the at least one intended LADN services using the downloaded data; and
downloading data relevant to the at least one intended LADN service upon detecting that the UE is located in the LADN service area.

10. A user equipment (UE) for prioritizing selection of cells, the UE comprising:
a transceiver; and
at least one processor configured to:
control the transceiver to receive local area data network (LADN) information from a serving cell comprising a type of each of LADN services that are supported by the serving cell and neighboring cells and tracking area codes of the neighboring cells;
select the at least one neighboring cell providing at least one intended LADN service among the neighboring cells based on the LADN information;
identify a strength and a quality of signals received from the at least one selected neighboring cell;
connect to one of the at least one selected neighboring cell when the identified strength and quality of the signals is above a threshold,
wherein the at least one processor is further configured to:
control the transceiver to receive at least one relay announcement message from at least one relay UE informing availability of the at least one intended LADN service, wherein the availability of the at least one intended LADN service is indicated in a spare bit field of the at least one relay announcement message;
measure at least one of a strength and a quality of signals received from the at least one relay UE; and connect to the at least one relay UE based on the availability of the at least one intended LADN service and the at least one of the strength and the quality of the signals received from the at least one relay UE.

11. The UE of claim 10, wherein the LADN information comprises of at least one currently received LADN service and the at least one intended LADN service, wherein the LADN information is sent to UE by an access and mobility function (AMF) through the serving cell,
wherein the LADN information is included in a message sent by the AMF as a response to a registration request message sent by the UE, wherein the registration request message includes the LADN service, and
wherein the LADN information sent by the AMF includes a plurality of LADN service IDs, wherein the UE selects the at least one intended LADN service of the LADN services.

12. The UE of claim 10,
wherein the UE is connected to the one of the at least one selected neighboring cell by sending an at least one service request, and
wherein the method further comprises updating at least one of a lookup table, a database, and a server in the UE including the LADN information after sending the at least one service request to the at least one selected neighboring cell, and wherein the threshold is configured by a network.

13. The UE of claim 10, wherein the at least one processor is further configured to:
control the transceiver to broadcast a relay query message informing the at least one intended LADN service, wherein the LADN service is indicated in a spare bit field of the relay query message;
control the transceiver to receive at least one relay query response message from at least one relay UE informing availability of the at least one intended LADN service, wherein the availability of the at least one intended LADN service is indicated in a spare bit field of the at least one relay query response message;
measure at least one of a strength and a quality of signals received from the at least one relay UE; and
connect to the at least one relay UE to avail the at least one intended LADN service based on the availability of the at least one intended LADN service, and the at least one of the strength and the quality of the signals received from the at least one relay UE.

14. The UE of claim 11, wherein the at least one processor is further configured to:
detect that the UE is at an edge of the one of the at least one selected neighboring cell, wherein the one of the at least one selected neighboring cell includes a first base station;
detect at least one cell providing a LADN service based on the LADN information;
measure at least one of a strength and a quality of signals received from at least one base station of the detected at least one cell; and
control the transceiver to send the measurements of the at least one of the strength and the quality of the signals received from the at least one base station to the first base station, wherein a cell amongst the detected at least one cell is selected as a target cell for handover based on the measurements.

15. The UE of claim 14, wherein the UE sends the LADN service to the first base station, wherein the first base station sends the LADN service to a second base station of the target cell, wherein the AMF sends the LADN service to the first base station, and wherein the first base station sends the LADN service to the second base station of the target cell.

16. The UE of claim 10, wherein the at least one processor is further configured to:

identify a secondary cell providing another LADN service based on the LADN information, wherein the one of the at least one selected neighboring cell is a primary cell;

control the transceiver to send a service request to a first base station of the at least one neighboring cell to receive the another LADN service provided by the secondary cell; and control the transceiver to receive a radio resource configuration (RRC) message indicating an addition of the secondary cell, wherein the addition of the secondary cell indicates enablement of the UE to avail the another LADN service.

17. The UE of claim 11, wherein the at least one processor is further configured to:

predict that a paging message, received from the AMF, is relevant to the LADN services;

identify whether the at least one neighboring cell is providing the LADN services; and control the transceiver to send a service request to the at least one neighboring cell if the at least one neighboring cell is providing the LADN services;

identify at least one cell providing the LADN services if the at least one neighboring cell is not providing the LADN services; and camp on the at least one identified cell providing the LADN services.

18. The UE claim 10, wherein the at least one processor is further configured to:

download data relevant to the at least one intended LADN service upon detecting that the UE is located at an edge of an LADN service area;

upon detecting that the UE has moved out of the LADN service area, avail the at least one intended LADN services using the downloaded data; and download data relevant to the at least one intended LADN service upon detecting that the UE is located in the LADN service area.

\* \* \* \* \*